(12) United States Patent
Yun et al.

(10) Patent No.: US 6,950,632 B1
(45) Date of Patent: Sep. 27, 2005

(54) TRANSMITTING AND RECEIVING DEVICE AND METHOD FOR CONTINUOUS OUTER-LOOP POWER CONTROL WHILE IN DTX MODE IN A CDMA MOBILE COMMUNICATION SYSTEM

(75) Inventors: Yu-Suk Yun, Seoul (KR); Soon-Young Yoon, Seoul (KR); Seung-Joo Maeng, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 584 days.

(21) Appl. No.: 09/584,047

(22) Filed: May 30, 2000

(30) Foreign Application Priority Data

May 29, 1999 (KR) ............................. 1999-19648
Jun. 12, 1999 (KR) ............................. 1999-21946

(51) Int. Cl.$^7$ ............................. H04B 1/00
(52) U.S. Cl. ................. 455/69; 455/522; 370/335
(58) Field of Search ................. 455/69, 67.11, 455/522, 127.1, 127.2; 370/329, 252, 335

(56) References Cited

U.S. PATENT DOCUMENTS 5,842,113 A * 11/1998 Nanda et al. ............. 455/69
6,075,974 A * 6/2000 Saints et al. ............. 455/69
6,373,823 B1 * 4/2002 Chen et al. ............. 370/252
6,545,989 B1 * 4/2003 Butler ................. 370/329
6,643,272 B1 * 11/2003 Moon et al. ............. 370/311

* cited by examiner

Primary Examiner—Erika A. Gary
(74) Attorney, Agent, or Firm—Dilworth & Barrese, LLP

(57) ABSTRACT

A device and method for continuous outer-loop power control on a physical channel which transmits only power control bits and no data while in discontinuous transmission (DTX) mode in a CDMA mobile communication system is disclosed. In the power controlling device according to one aspect of the present invention, a frame error detector detects an error from a frame of predetermined length and generates an error signal indicating whether an error has been generated. A closed-loop power controller compares a threshold with the signal-to-noise ratio (SNR) in each power control group (PCG) in a plurality of periods of the frame and generates power control information according to the comparison result. An outer-loop power controller increases the threshold in order to generate power control information that commands a power increase in response to an error signal indicating the existence of a frame error, and decreases the threshold in order to generate power control information that commands a power decrease in response to an error signal indicating the absence of a frame error. An offset controlling unit, which is connected to the outer-loop power controller, receives gating information about the gated transmission of data in a frame at a predetermined rate, and generates an offset signal, which indicates an offset corresponding to a changed gating rate if the gating rate is changed.

14 Claims, 32 Drawing Sheets

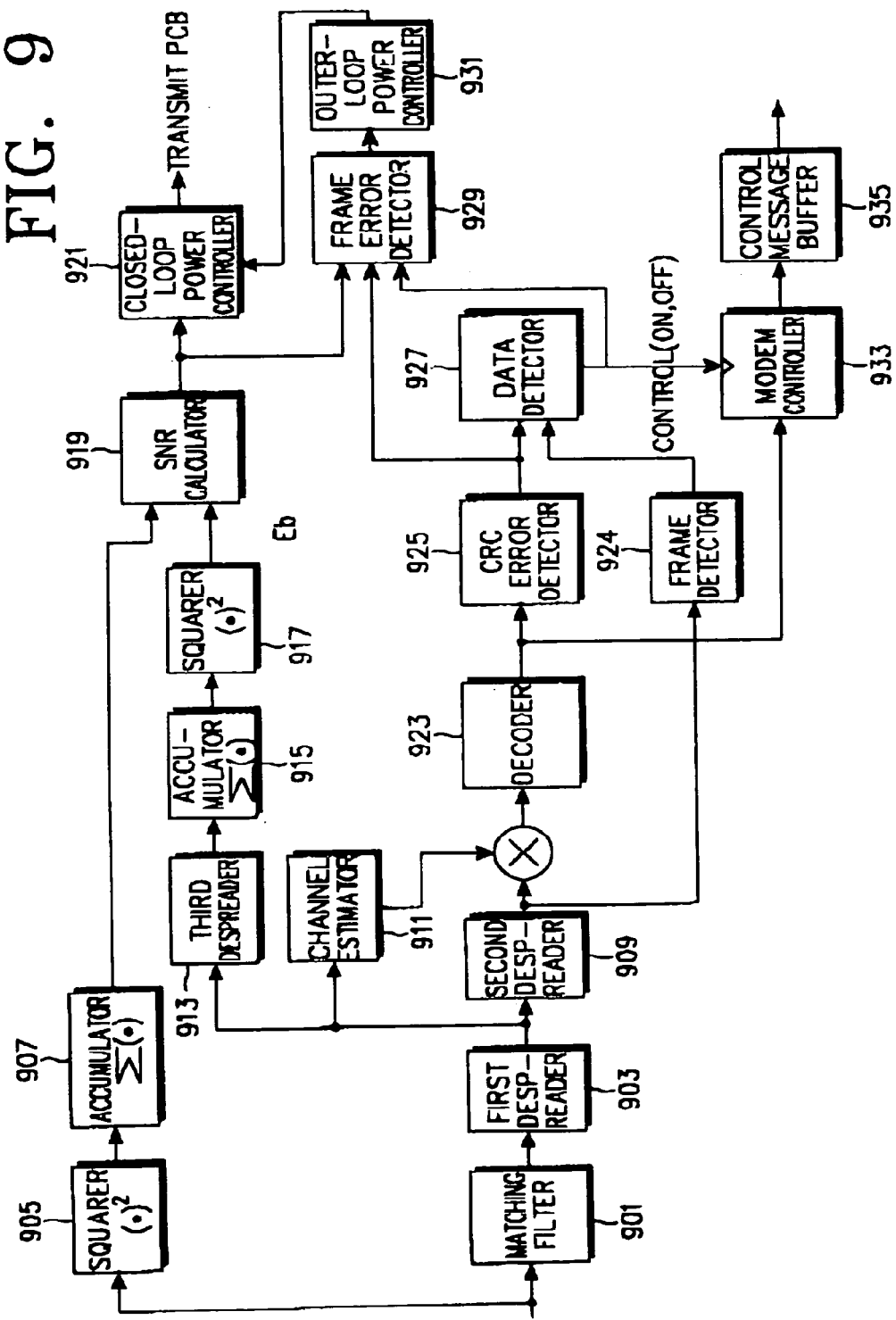

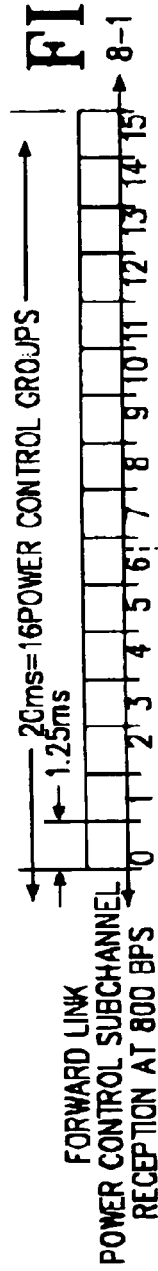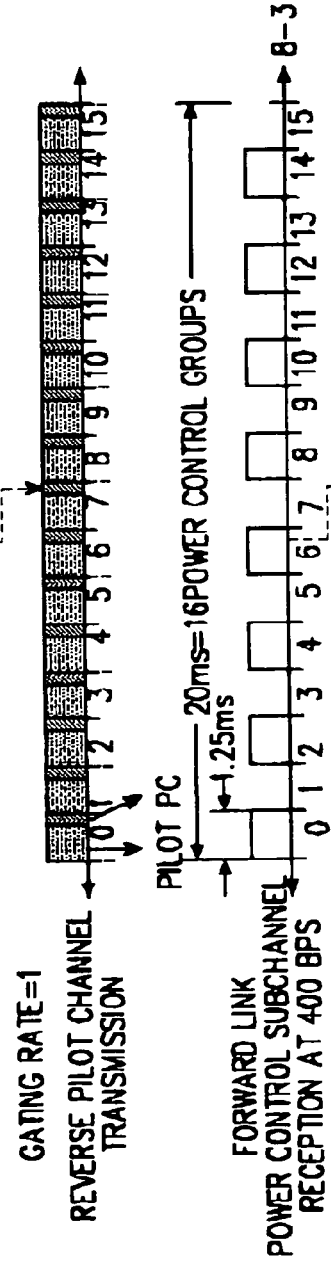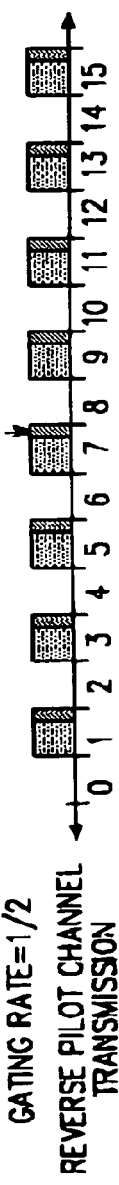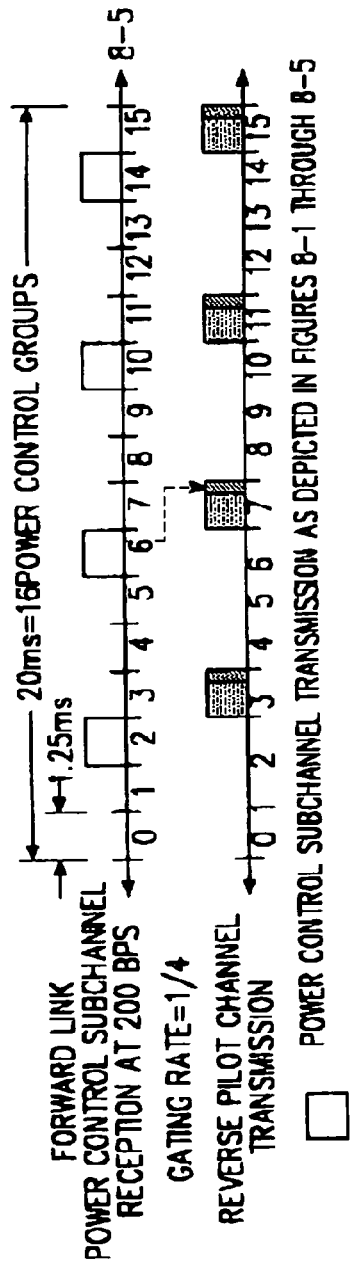
FIG. 17

TRANSMITTING AND RECEIVING DEVICE AND METHOD FOR CONTINUOUS OUTER-LOOP POWER CONTROL WHILE IN DTX MODE IN A CDMA MOBILE COMMUNICATION SYSTEM

PRIORITY

This application claims priority to an application entitled "Transmitting/Receiving Device and Method for Continuous Outer-Loop Power Control in DTX mode of CDMA Mobile Communication System" filed in the Korean Industrial Property Office on May 29, 1999 and assigned Serial No. 99-19648, as well as application Serial No. 99-21946, filed in the Korean Industrial Property Office on Jun. 12, 1999, the contents of both of which are hereby incorporated by reference.

BACKGROUND OF THE INVENTION

1. Field of the Invention

The present invention relates generally to a device and method for outer-loop and closed-loop power control of a CDMA (Code Division Multiple Access) mobile communication system in DTX (Discontinuous Transmission) mode, and in particular, to a device and method for continuous outer-loop power control of a physical channel which transmits only power control bits (PCBs) without data.

2. Description of the Related Art

In the IS-2000 standard, packet transmission is implemented in three ways: the P1 option using a fundamental traffic channel and a supplemental channel (SCH), the P2 option using a fundamental traffic channel and a dedicated control channel (DCCH), and the P3 option using a fundamental traffic channel, a DCCH, and an SCH. A traffic channel and a DCCH transmit control information about packets and a signaling message and an SCH transmits packet data. The control information and the signaling message are generated discontinuously. In the absence of data traffic, the fundamental traffic channel transmits null traffic. A forward DCCH transmits only power control bits and a reverse DCCH transmits only pilot symbols and power control bits if there is no data traffic to be transmitted. That is, the DCCH only transmits data when there is data to transmit. This is called a DTX mode.

Meanwhile, in comparison with the W-CDMA (Wideband-CDMA standard according to the 3GPP, the Third Generation Partnership Project), the Japanese and European IMT-2000 (International Mobile Telecommunications 2000) standard, the conventional IS-95 CDMA mobile communication system that mainly provides voice service releases a channel once the data is completely transmitted and requests a channel and connects to the channel when necessary. However, the conventional method cannot provide other high quality services like packet data service because it involves many delay factors such as reconnection delay time. Therefore, other services including packet data service should be provided in a new method. In many cases, data is intermittently transmitted during packet data service such as Internet access and file download. As a result, a non-transmission period is interposed between packet data transmission periods. According to the conventional technology, a dedicated data channel is released or maintained for the non-transmission period. In the former case, a long time is taken to reconnect a channel, making it impossible to provide a corresponding service; whereas, in the latter case, channels which are transmitting no data, are maintained, drastically reducing usage efficiency of the system. This problem can be solved by establishing a DCCH between a base station and a mobile station to transmit and receive a control signal associated with a dedicated data channel for a transmission period, and to be maintained when the dedicated data channel released for a non-transmission period, so that channels can be used efficiently and channel reconnection occurs rapidly upon generation of transmission data. This state is termed the control only substate.

An outer power control loop and a closed power control loop are used together for power control in a DTX mode. The closed power control loop controls power in power control group (PCG) units using a threshold fixed for each frame, while the outer power control loop varies a threshold depending on the presence or absence of frame errors and feeds the threshold to a closed-loop power controller. In the case of using both the outer power control loop and the closed power control loop while in DTX mode, a closed-loop power control is executed using a threshold determined in the outer power control loop upon generated of frames, and using the previous threshold in the absence of frames to transmit.

There will be given a description of the outer-loop power control and the closed-loop power control in a DTX mode.

FIGS. 1A and 1B are block diagrams of a transmitter in a typical CDMA mobile communication system. Insertion of PCBs in the DTX mode will be described referring to FIGS. 1A and 1B.

A control message buffer 111 is a memory for temporarily storing a control message transmitted for communication of a control message on a DCCH. The message buffer 111 is configured to have a capacity enough to store one or more frames. The control message buffer 111 interfaces a control message between a higher layer processor and a MODEM controller 113. The higher layer processor stores a control message added with header information to identify a frame according to a message type in the control message buffer 111, sets a flag to notify the storage, reads the control message from the control message buffer 113, and clears the flag to notify the read, thereby preventing over-write and over-read.

The MODEM controller 113 reads the control message from the control message buffer 111, the MODEM controller 113 determines a message type by analyzing the header of the control message, and outputs a payload to be transmitted on a DCCH according to the message type and a corresponding control signal. The control message is variable in duration according to the analysis result, usually 5 or 20 ms. The MODEM controller 113 determines whether there is a control message to transmit and controls transmission of the DCCH. That is, the MODEM controller 113 generates a first gain control value for signal Gc in the presence of a control message to be transmitted and a second gain control value for signal Gc for blocking signal transmission on the DCCH in the absence of a control message. The gain control signal Gc is for controlling the transmission power of the DCCH. While the gain controller is located at the front end of a spreader, the same effect can be produced even if it is at the rear end of the spreader.

The MODEM controller 113 controls transmission of the DCCH while in DTX mode. That is, the MODEM controller 113 performs a DTX mode control according to the capacities of the data service signals and MAC (medium access control) related messages communicated on the DCCH, to thereby use channel capacity efficiently. Since voice traffic and signal traffic are multiplexed in IS-95, both a voice channel and a signaling channel should be opened all the time for data service. However, the DCCH operates in the DTX mode and thus need not be opened for a control signal If no signaling information to be transmitted exists, a DTX gain controller reduces transmission power for efficient use of radio resources.

A CRC (Cyclic Redundancy Check) generator 115 adds a CRC to the control message received from the MODEM controller 113 to allow a receiver to determine the quality of a frame, that is, the presence or absence of a frame error. The CRC generator 115 outputs a control message with the CRC under the control of the MODEM controller 113. A 40-bit control message with a 16-bit CRC is generated for a 5 ms-frame, and a 184-bit control message with a 12-bit CRC for a 20 ms-frame.

A tail bit generator 117 analyzes the output of the CRC generator 115 and adds corresponding tail bits to the output of the CRC generator 115, for terminating an error correction code. Here, the tail bit generator 117 generates 8 tail bits.

An encoder 119 encodes the output of the tail bit generator 117 at a code rate of ⅓. The encoder 119 can be a convolutional encoder or a turbo encoder. An interleaver 121 permutes the bit sequence of encoded symbols received from the encoder 119 in frame units to protect the data from burst errors.

The CRC generator 115, the tail bit generator 117, the encoder 119, and the interleaver 121 form a control message generator 150 for generating a control message and transmitting it on a physical channel. While the control message generator 150 processes a control message for a frame in FIG. 1A, it can be contemplated that the MODEM controller 113 selects a control message generator corresponding to the length of a frame to transmit among as many control message generators as the frame lengths of control messages transmitted on the DCCH. In this case, each control message generator should be provided with a CRC generator, a tail bit generator, an encoder, and an interleaver according to the frame length of a control message processed in the control message generator.

A signal mapper 123 maps 1s and 0s of the interleaved symbols to −1s and 1s, respectively. A gain multiplier 125 performs a DTX mode function by establishing a path for transmitting the DCCH control message or blocking the path depending on which gain control message is received from the MODEM controller 113.

A PCB inserter 127 inserts a PCB into a signal received from the multiplier 125. A serial-to-parallel converter (SPC or S/P) 129 multiplexes control message symbols received from the PCB inserter 127 and distributes the multiplexed symbols to carrier spreaders. Here, three carriers are used by way of example. For the three carriers, six channels are produced from three carrier frequencies and two phases (I and Q channels) of each carrier. The PCB can be used for controlling the reverse link power of a mobile station.

FIG. 1B is a block diagram of a spreader for spreading symbols received from the PCB inserter 127. A forward link transmitter includes as many as spreaders as carriers. One spreader corresponding to one carrier is shown in FIG. 1B. Referring to FIG. 1B, an orthogonal code generator 135 generates a DCCH orthogonal code which can be a Walsh code or a quasi-orthogonal code. Multipliers 131 and 133 multiply I- and Q-channel signals of the forward DCCH control message by the orthogonal code, for orthogonal spreading.

A modulator 137 PN-spreads the orthogonally spread I- and Q-channel signals received from the multipliers 131 and 133 with PN codes PNi and PNq received from a PN sequence generator (not shown). A complex multiplier can be used as the modulator 137.

The above embodiment is a 3× multi-carrier system and can be applied to a transmitter in a 1× or 3× DS (direct sequence) system. Thus, a description of the 1× or 3× DS system will be omitted.

FIG. 2 is a block diagram of a reverse link transmitter which operates in a DTX mode for the general CDMA mobile communication system. As shown in FIG. 2, the reverse link transmitter is similar to the forward link transmitter in structure. Therefore, a description of the same components will be omitted.

An orthogonal spreader 207 generates a Walsh code. A first multiplier 209 multiplies a transmission signal received from a signal mapper 205 by the Walsh code received from the orthogonal spreader 207, for orthogonal spreading. A gain multiplier 221 outputs no data upon receipt of a gain control signal 0 from a MODEM controller 203 if there is no transmission message and outputs data upon receipt of a gain control signal 1 from the MODEM controller 203 if a transmission message exists. A summing device 223 forms a DCCH signal by summing the transmission signal received from the gain multiplier 221 and a pilot/PCB channel signal. A PN spreader 225 complex-PN-spreads the DCCH signal.

FIG. 25A is a block diagram of a base station transmitter in a typical asynchronous IMT-2000 system. A description of the same components as in FIG. 1 will be omitted. In FIG. 25A, a rate converter 2517 changes the rate of the output signal of an encoder 2515 to that of the input signal of an interleaver 2519 by repeating or puncturing the output of the encoder 2515 when the rate at the output of the encoder 2515 is different from that at the input of the interleaver 2519. A multiplexer 2523 time-division-multiplexes a gain-controlled dedicated physical data channel (DPDCH) and a dedicated physical control channel (DPCCH) and feeds the multiplexed signal to a signal mapper 2525.

FIG. 26A is a block diagram of a mobile station transmitter in the typical asynchronous IMT-2000 system. As shown in FIG. 26A, the mobile station transmitter is similar to the base station transmitter in structure. Therefore, a description of the configuration and operation of the mobile station transmitter will be omitted herein.

There will be given a description of the structures and operations of forward and reverse link receivers for performing an outer-loop power control and a closed-loop power control using a reverse pilot channel and a PCB received on a forward DCCH, respectively, with reference to FIGS. 3 and 4.

FIG. 3 is a block diagram of a reverse link receiver in a DTX mode for the general CDMA mobile communication system.

Referring to FIG. 3, a first despreader 301 is a PN despreader for PN-despreading a received signal. A second despreader 303 is a DCCH Walsh despreader for despreading a DCCH signal included in the PN-despread signal received from the first despreader 301 with a Walsh code. A channel estimator 305 detects a fading component using a pilot channel included in the PN-despread signal received from the first despreader 301. A third despreader 307 is a pilot channel Walsh despreader for despreading the pilot channel signal included in the PN-despread signal received from the first despreader 301 with a Walsh code.

A multiplier 314 multiplies the complex conjugate of the fading component received from the channel estimator 305 by the DCCH signal received from the second despreader 303 in symbol units, for error compensation. A PCB extractor 317 extracts a PCB from the error-compensated DCCH signal received from the multiplier 314. A bit energy measurer 309 measures bit energy $E_b$ from the PCB received from the PCB extractor 317 and the fading component received from the channel estimator 305. A noise measurer 311 measures noise energy $N_t$ from the symbol value of the pilot channel received from the third despreader 307 and the fading component from the channel estimator 305. An SNR calculator 313 calculates an SNR from the noise energy $N_t$ and the bit energy $E_b$. For details of an $E_b$ and $N_t$ measuring method, see "Forward Link Closed Loop Power Control Method for cdma 2000-(Rev. 1)", Stein Lundby, Contribution to TR45.5.3.1./98.12.08.28.

A decoder 319 decodes the output of the PCB extractor 317 and a CRC error detector 321 performs a CRC error check on the decoded signal received from the decoder 319. The output of the CRC error detector 321 is True (1) or False (0). Since the DCCH channel is transmitted in the DTX mode, the receiver calculates a CRC from a frame if the frame has transmission data to determine whether a frame error has occurred. For details of a method of determining whether a DCCH has frame data or not while in DTX mode, see Korean Application Serial No. 98-04498. A frame detector 322 detects whether a frame exists or not. A data detector 323 receives frame data and a CRC error check result from the CRC error detector 321 and generates an on/off control signal to a MODEM controller 325. The MODEM controller 325 is activated by the on/off control signal to detect a control message from the decoded data received from the decoder 319 and to store the control message in a control message buffer 327.

If the receiver performs closed-loop power control alone, a closed-loop power controller 315 compares the SNR of each PCB received from the SNR calculator 313 with a fixed threshold and controls power according to the comparison result. If the receiver performs closed-loop power control and outer-loop power control together, an outer-loop power controller 329 is further provided to the receiver. The outer-loop power controller 329 determines a threshold and then the closed-loop power controller 315 performs a closed-loop power control using the threshold. The outer-loop power controller 329 is activated upon receipt of a frame existence flag from the data detector 323 and determines the threshold from the CRC check result received from the CRC error detector 321.

Referring to FIG. 6, a closed-loop power control method in the above reverse link receiver will be described.

In step 601, the SNR calculator 313 calculates an SNR from $N_t$ and $E_b$ measured by the noise measurer 311 and the bit energy measurer 309, respectively. Upon receipt of the SNR from the SNR calculator 313, the closed-loop power controller 315 compares the SNR with a fixed threshold in step 603. If the SNR is greater than the threshold, the closed-loop power controller 315 transmits a power-down command (PCB=0) to a mobile station in step 607. If the SNR is equal to or greater than the threshold, the closed-loop power controller 315 transmits a power-up command (PCB=1) to the mobile station in step 605.

FIG. 4 is a block diagram of a forward link receiver in a DTX mode in the general CDMA mobile communication system. The structure and operation of the forward link receiver will be described referring to FIG. 4.

In FIG. 4, a squarer 401 squares an input signal in sub-chip units. An accumulator 403 sums sub-chip energies for one PCG. The sum is estimated as noise energy. A matching filter 405 filters the input signal in sub-chips in chip units. A first despreader 407 PN-despreads the output of the matching filter 405 and outputs the PN-despread signal to a second despreader 409, a channel estimator 411, and a third despreader 413. The third despreader 413 despreads a pilot channel signal included in the PN-despread signal with a Walsh code. An accumulator 415 sums chip energies of the Walsh-spread signal. A squarer 417 squares the sum and outputs the square to an SNR calculator 417. The output of the squarer 417 is estimated as bit energy. The other components are the same as their counterparts shown in FIG. 3 in structure but labeled with different reference numerals. The reverse link receiver also performs a closed-loop power control in the same manner as shown in FIG. 6.

FIG. 5 illustrates DCCH transmission on a forward link and on a reverse link while in DTX mode according to the IS-95C standard. The forward DCCH transmits data discontinuously and PCBs continuously regardless of the presence or absence of data. Also on the reverse link, data is discontinuously transmitted on the DCCH. If no data to be transmitted exists, pilot symbols and PCBs are transmitted on a pilot channel. Hence, the DCCH transmits no PCBs.

In the case of a traffic channel which continuously transmits frames, a receiver can perform outer-loop power control continuously to obtain an intended frame error rate (FER). However, since the DCCH transmits in DTX mode, the outer-loop power control can be used only when transmission frames are present.

FIG. 7 is a flowchart illustrating a general outer-loop power control method. The outer-loop power control method will be described with reference to FIGS. 3 and 7.

As shown in FIG. 7, upon receipt of frame data, the outer-loop power controller 329 determines whether a frame error has been generated based on a CRC error check result received from the CRC error detector 321 in step 701. If a frame error exists, the outer-loop power controller 329 receives a frame existence flag from the data detector 323. If the frame existence flag indicates existence of a frame, the outer-loop power controller 323 increases a threshold in step 703. If the frame existence flag indicates the absence of a frame, the outer-loop power controller 323 decreases the threshold for power control in step 705. Procedures other than the above one can be employed for the outer-loop power control.

When the outer-loop power control method and the closed-loop power control method are used concurrently, a threshold updated for each frame in the outer-loop power control method is used as a reference SNR value in the closed-loop power control method.

FIG. 18A is a block diagram of a mobile station receiver for processing a DPCH received in a DTX mode in an asynchronous IMT-2000 system employed in Japan and Europe. In FIG. 18A, a channel separator 1805 separates a DPCCH from an input DPCH. A channel estimator 1809 obtains information about channel status from the DPCCH received from the channel separator 1805, using pilot symbols. An SNR measurer 1807 calculates pilot energy $E_b$ and noise energy $N_t$ from pilot symbols. A bit energy measurer 1813 receives a DPDCH and the DPCCH, compares their energies, and outputs the comparison result to a data detector. The other components have been described before.

FIG. 18B is a block diagram of a base station receiver for processing a DPCH received while in DTX mode in the asynchronous IMT-2000 system. As shown in FIG. 18B, the base station receiver is similar in structure to the mobile station receiver. Hence, its description is omitted.

As described above, the conventional outer-loop power control method is not applied when no frame exists during a DTX mode on a channel like DCCH since an outer-loop power control is performed based on a determination whether a received frame has an error or not. Therefore, if no frame is transmitted in DTX mode, a threshold set for a previous frame is used.

As a result, when frame transmission resumes and the previous threshold is higher than a threshold which should be set for receiving the current frame without errors, unnecessary transmission power is consumed. On the other hand, if the previous threshold is lower than the desirable threshold, frame errors are increased. The increase of frame errors and transmission power dissipation decrease communication quality and base station capacity.

SUMMARY OF THE INVENTION

It is, therefore, a first object of the present invention to provide a device and method for implementing outer-loop power control while in DTX mode regardless of presence or absence of data in a CDMA mobile communication system.

It is a second object of the present invention to provide a device and method for implementing outer-loop power control while in DTX mode, regardless of the presence or absence of data, by tabulating FERs versus data service types and determining whether frame errors exist referring to the table upon absence of transmission data in a CDMA mobile communication system.

It is a third object of the present invention to provide a device and method for implementing outer-loop power control while in DTX mode, regardless of the presence or absence of data, by determining whether frame errors exist using a specific threshold upon absence of transmission data in a CDMA mobile communication system.

It is a fourth object of the present invention to provide a device and method for compensating for an offset threshold according to state transition to reduce the time required to change a threshold set in the previous state to a threshold set in a state transitioned from the previous state during outer-loop power control in a CDMA mobile communication system.

It is a fifth object of the present invention to provide a device and method for minimizing the transmission power of a control channel when only the control channel is transmitted in a gated mode and ensuring the reception capacity of a traffic channel when the traffic channel is transmitted by controlling the transmission power gains of the control and traffic channels in a control hold state in a CDMA mobile communication system.

It is a sixth object of the present invention to provide a device and method for preventing consumption of transmission power when data transmission resumes in a CDMA mobile communication system.

It is a seventh object of the present invention to provide a device and method for minimizing frame errors increased when data transmission resumes in a CDMA mobile communication system.

It is an eighth object of the present invention to provide a device and method for increasing communication quality and base station capacity in a CDMA mobile communication system.

These and other objects can be achieved by providing a power controlling device. In the power controlling device according to one aspect of the present invention, a frame error detector detects an error from a frame of a predetermined length and generates an error signal indicating whether an error has been generated. A closed-loop power controller compares a fixed threshold with the signal-to-noise ratio (SNR) in each of power control groups (PCG) in a plurality of periods of the frame and generates power control information according to the comparison result. An outer-loop power controller increases the fixed threshold to generate the power control information commanding power increase in response to the error signal indicating the existence of a frame error and decreases the fixed threshold to generate the power control information commanding power decrease in response to the error signal indicating the absence of a frame error. An offset controlling unit is connected to the outer-loop power controller, receives gating information about gated transmission of data in the frame at a predetermined rate, and generates an offset signal indicating an offset corresponding to a changed gating rate if the gating rate is changed.

According to another aspect of the present invention, there is provided a power controlling method in a CDMA mobile communication system. In the power controlling method, an offset controller receives an offset table with offsets versus state transitions through a higher layer message from a base station upon state transition and stores the offset table in an offset table storage. The offset controller also receives information about a pre-transition gating rate and a post-transition gating rate through the higher layer message and reads a corresponding offset from the offset table. An outer-loop power controller performs an outer-loop power control operation by adding a previous threshold to the offset received from the offset controller and outputs a fixed threshold.

BRIEF DESCRIPTION OF THE DRAWINGS

The above and other objects, features and advantages of the present invention will become more apparent from the following detailed description when taken in conjunction with the accompanying drawings in which:

FIG. 9 is a block diagram of an embodiment of a forward link receiver for outer-loop power control while in a DTX mode according to the present invention;

FIG. 17 illustrates gated transmission while in DTX mode according to an embodiment of the present invention;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

An outer-loop power control operation of the present invention is executed by use of information about the presence or absence of frame errors if frames exist and by estimating the presence or absence of frame errors if no frames exist. The present invention enables continuous outer-loop power control on a DCCH transmitted in a DTX mode.

Figure 3:
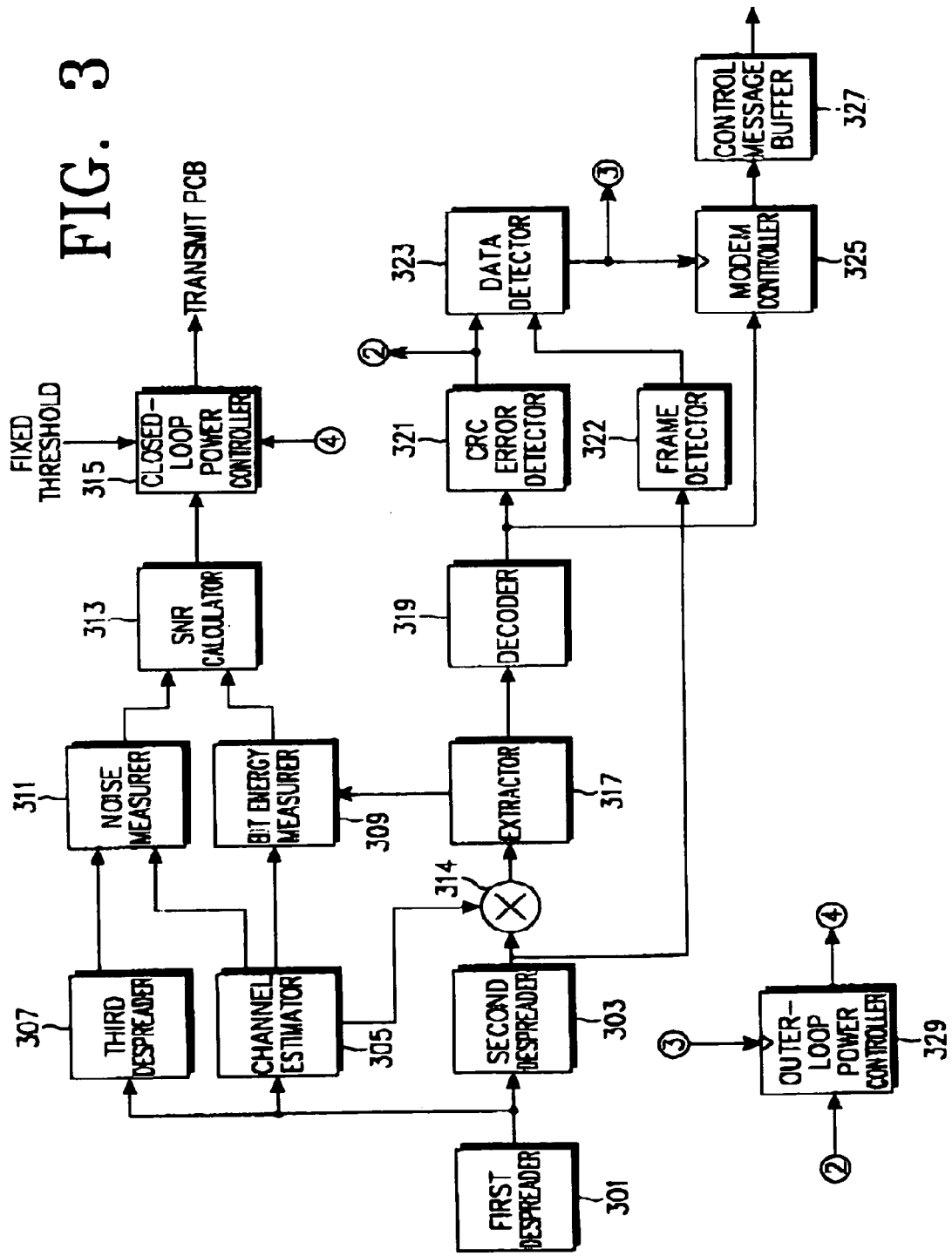
FIG. 3 is a block diagram of a reverse link receiver operated in a DTX mode in a conventional CDMA mobile communication system.
Figure 4:
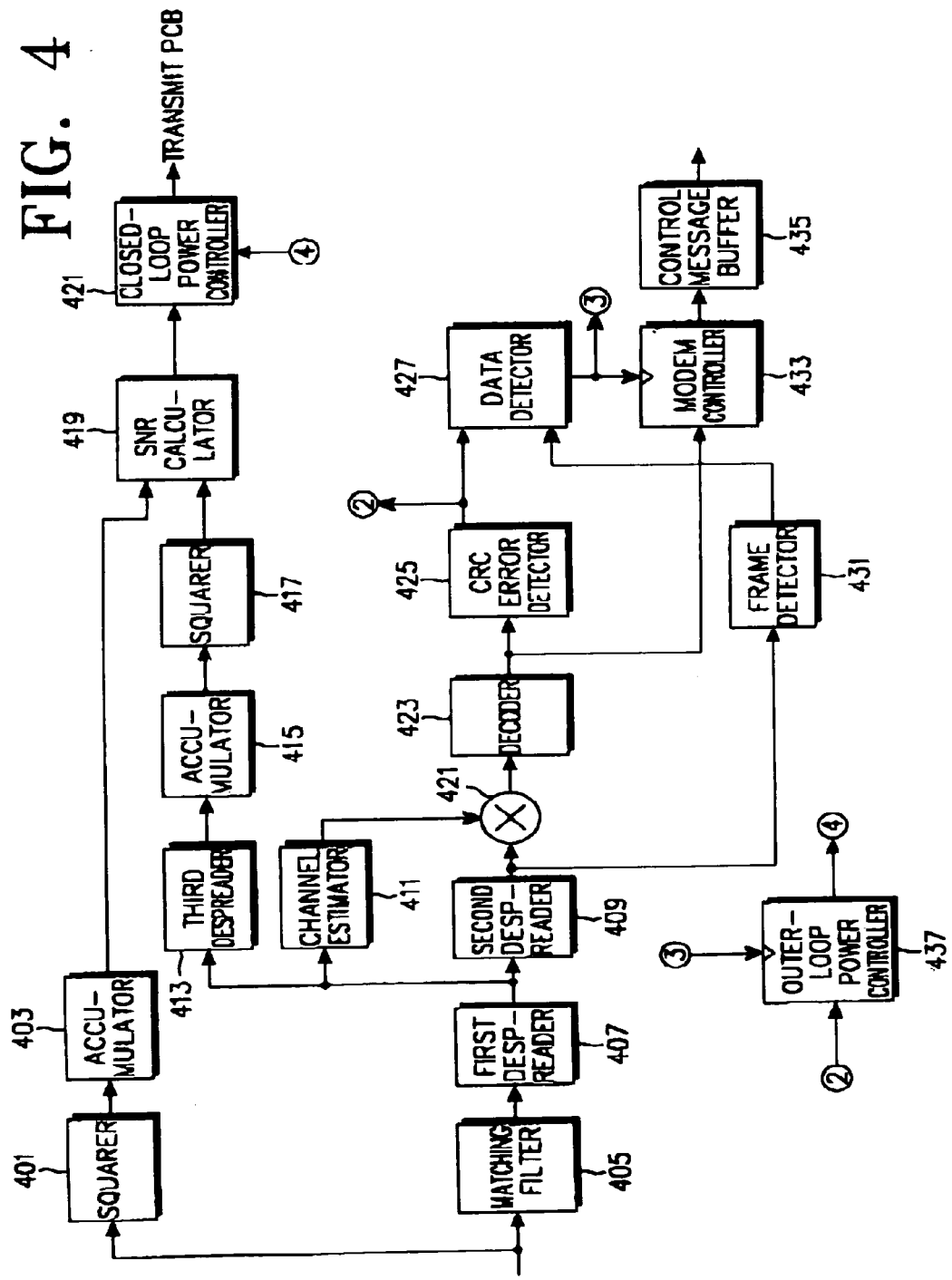
FIG. 4 is a block diagram of a forward link receiver operated in a DTX mode in a conventional CDMA mobile communication system.
Figure 5:
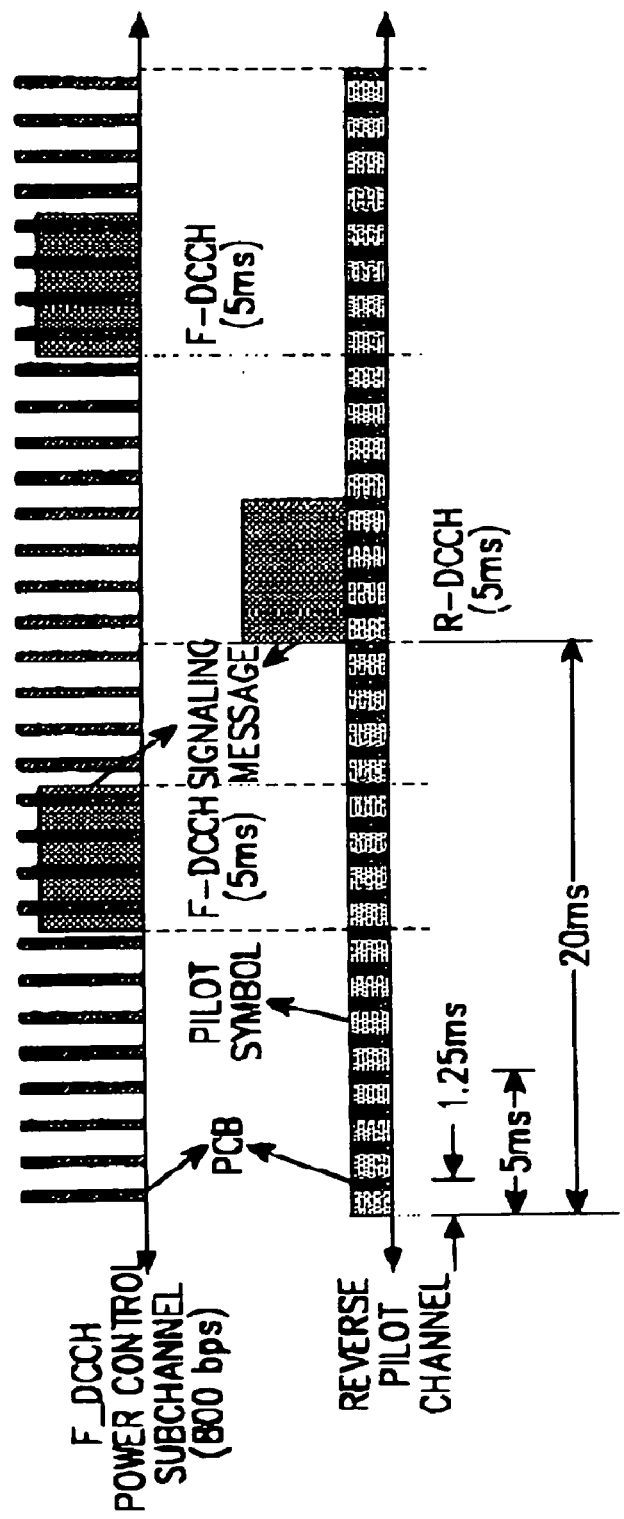
FIG. 5 illustrates IS-95c DCCHs transmitted while in DTX mode on forward and reverse links.
Figure 6:
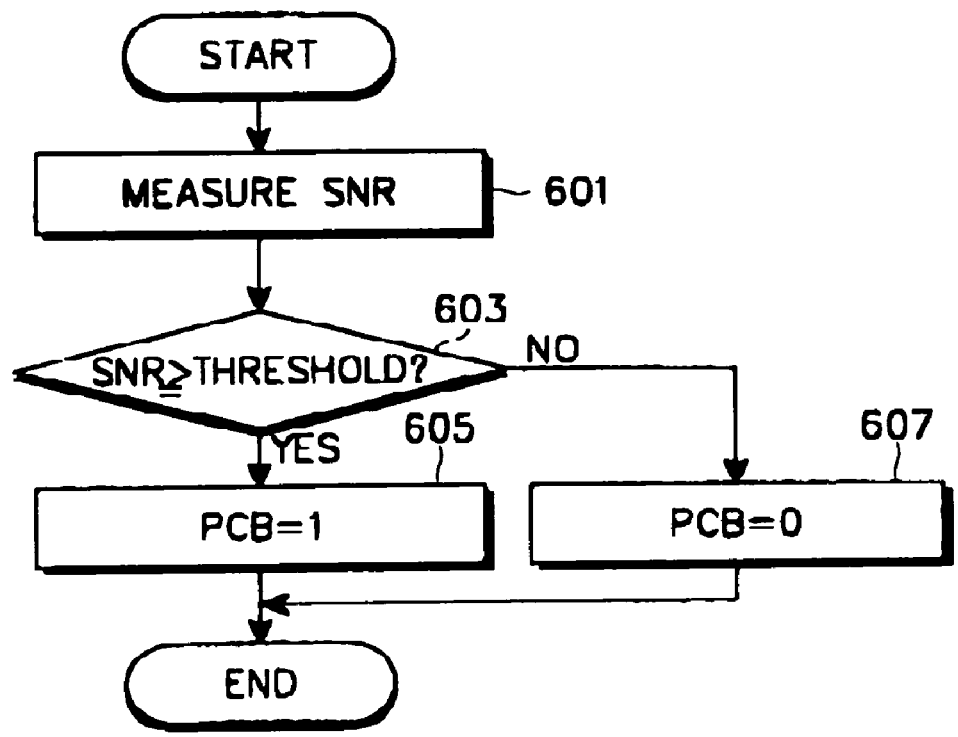
FIG. 6 is a flowchart illustrating a conventional closed-loop power control method.
Figure 8:
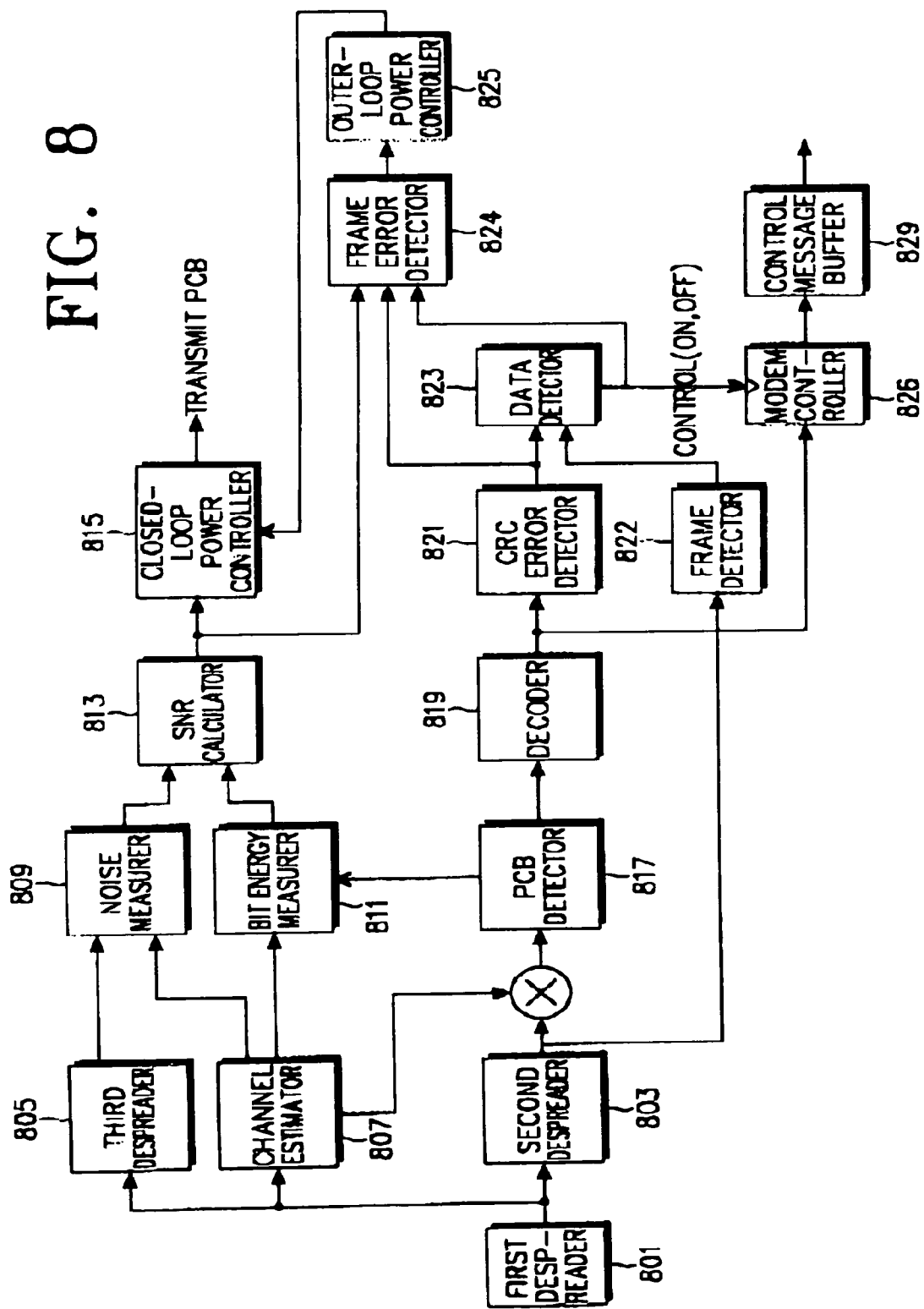
FIG. 8 is a block diagram of an embodiment of a reverse link receiver for outer-loop power control while in a DTX mode according to the present invention.

FIG. 8 is a block diagram of a receiver in a mobile station for outer-loop power control while in DTX mode. The same components as shown in FIG. 3 will either be described briefly or not be described.

Referring to FIG. 8, a CRC error detector 821 determines whether frame data received from a decoder 819 has errors and outputs a CRC error check result to a data detector 823 and a frame error detector 824. A frame detector 822 measures the energy of a DCCH to determine whether frame data exists or not and feeds the measured energy to a data detector 823. If the measured energy is greater than a predetermined level, the data detector 823 determines that frame data exists and outputs a frame existence flag set to 1 to the frame error detector 824. If no frame exists, the frame existence flag is set to 0. Upon receipt of the CRC error check result from the CRC error detector 821 and information indicating the frame existence from the frame detector 822, the data detector 823 outputs an on/off control signal to a MODEM controller 826 and the frame error detector 824. The data detector 823 will later be described in more detail in connection with FIG. 11.

An SNR calculator 813 calculates an SNR from noise energy $N_t$ received from a noise measurer 809 and bit energy $E_b$ received from a bit energy measurer 811.

The frame error detector 824 receives the SNR from the SNR calculator 813, the CRC error check result from the CRC error detector 821, and the flame existence flag message from the data detector 823 and determines whether frame errors have been generated. The means of determination will be described in detail with reference to FIG. 10A. If it turns out that frame errors exist, the frame error detector 824 outputs a frame error indicator to an outer-loop power controller 825.

Figure 7:
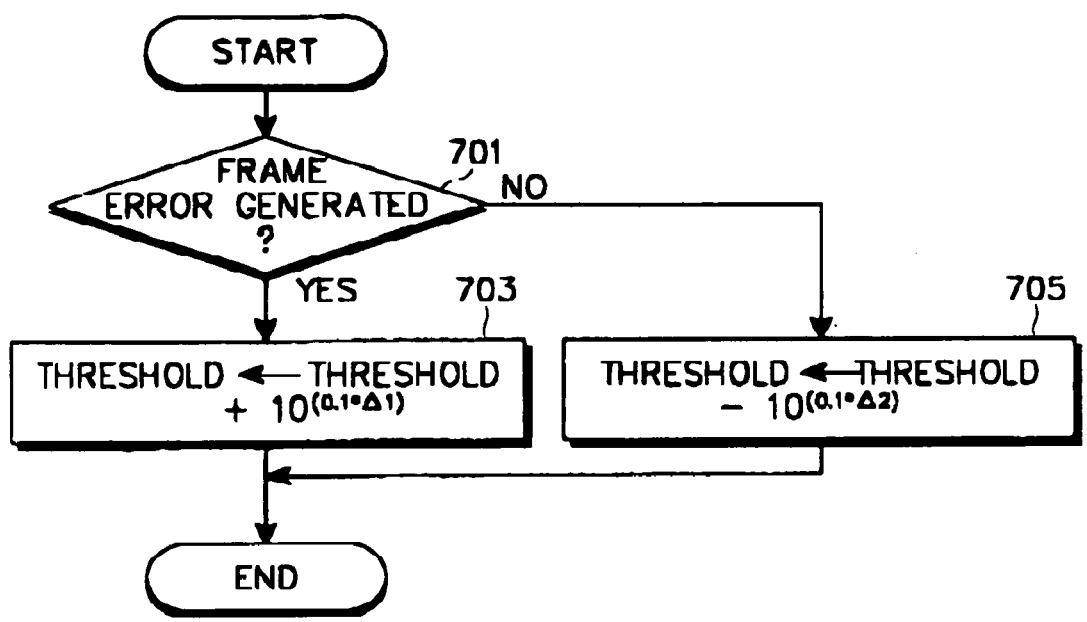
FIG. 7 is a flowchart illustrating a conventional outer-loop power control method.

The outer-loop power controller 825 performs an outer-loop power control in the procedure shown in FIG. 7 and outputs a threshold to a closed-loop power controller 815. Then, the closed-loop power controller 815 performs a closed-loop power control using the threshold.

The following description will be conducted with the appreciation that a channel state measuring portion includes a channel estimator, a noise measurer, and a bit energy measurer, a frame decision portion includes a frame detector and a data detector, and an outer-loop power control portion includes a frame error detector and an outer-loop power controller.

FIG. 9 is a block diagram of a base station receiver for outer-loop power control in a DTX mode according to an embodiment of the present invention. Referring to FIG. 9, a decoder 923 outputs frame data to a CRC error detector 925 and a MODEM controller 933. The CRC error detector 925 determines whether the frame data has errors and outputs a CRC error check result to a data detector 927 and a frame error detector 929. A frame detector 924 measures the energy of a DCCH to determine whether frame data exists or not and feeds the measured energy to the data detector 927. If the measured energy is greater than a predetermined level, the data detector 927 determines that frame data exists and outputs a frame existence flag set to 1 to the frame error detector 929. If no frame exists, the frame existence flag is set to 0. Upon receipt of the CRC check result from the CRC error detector 925 and the frame existence information from the frame detector 924, the data detector 927 outputs an on/off control signal to the MODEM controller 933 and the frame error detector 929. The data detector 927 will later be described in more detail with reference to FIG. 11.

An SNR calculator 919 calculates an SNR from $N_t$ measured from an input signal in sub-chip units by a squarer 905 and an accumulator 907 and bit energy $E_b$ measured from the output of a third Walsh despreader 913 by an accumulator 915 and a squarer 917.

The frame error detector 929 receives the SNR from the SNR calculator 919, the CRC error check result from the CRC error detector 925, and the frame existence flag message from the data detector 927, and determines whether frame errors have been generated. A determination method will be described in detail with reference to FIG. 10B. If it turns out that frame errors exist, the frame error detector 929 outputs a frame error indicator to an outer-loop power controller 931.

The outer-loop power controller 931 performs outer-loop power control in the procedure shown in FIG. 7 and outputs a threshold to a closed-loop power controller 921. Then, the closed-loop power controller 921 performs closed-loop power control using the threshold.

A frame error detector according to the present invention can operate in many ways. In the following description, two ways will be presented. The same components in the forward and reverse link receivers will be described referring to FIG. 8.

Figure 10A:
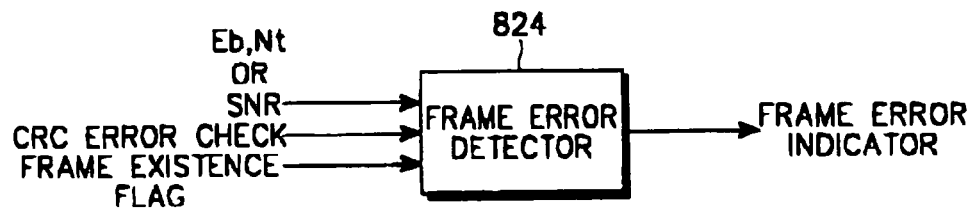
FIGS. 10A and 10B are block diagrams of a frame error detector which enables outer-loop power control while in DTX mode.

Now, an embodiment of the frame error detector according to the present invention will be described referring to FIGS. 10A and 10B. FIG. 10A illustrates input and output of the frame error detector according to the embodiment of the present invention and FIG. 10B is a detailed block diagram of the frame error detector.

Referring to FIG. 10A, the frame error detector (824 or 929) outputs a frame error indicator indicating the presence or absence of a frame error, for the input of an SNR, a CRC error check result, and a frame existence flag message.

Figure 10B:
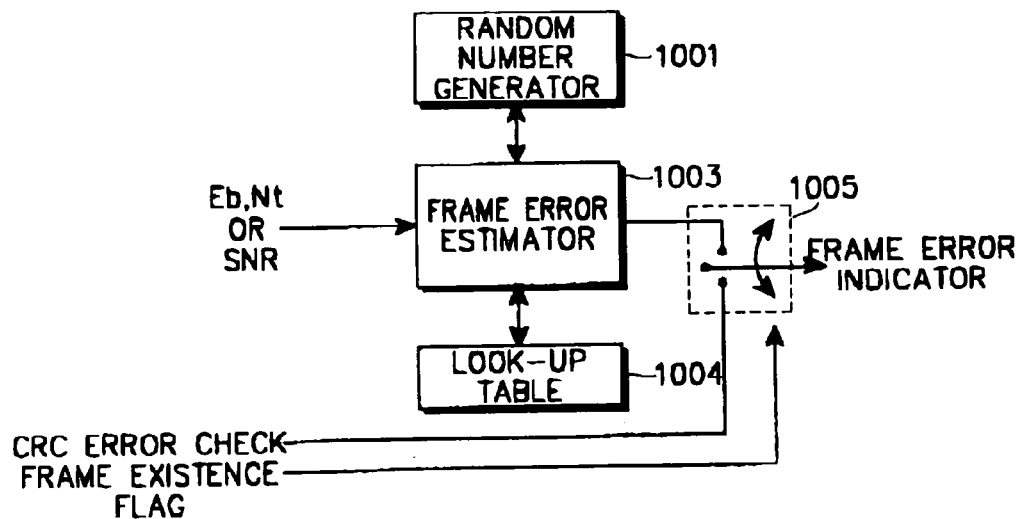
Figure 14A:
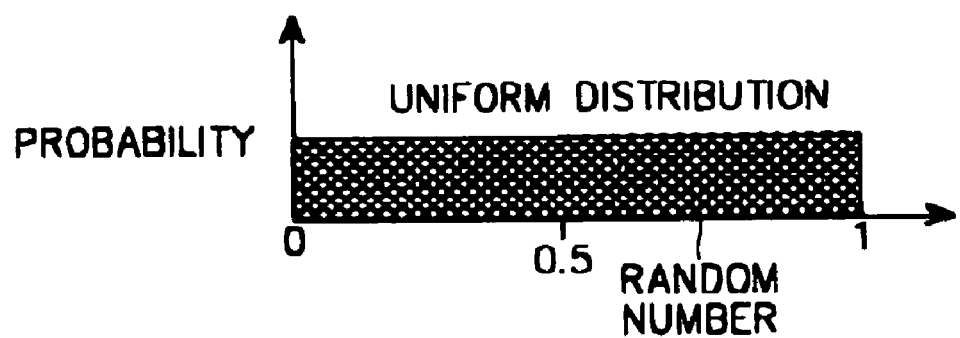
FIG. 14A illustrates the range of random numbers generated according to the first embodiment of the frame error estimating method according to the present invention.
Figure 14B:
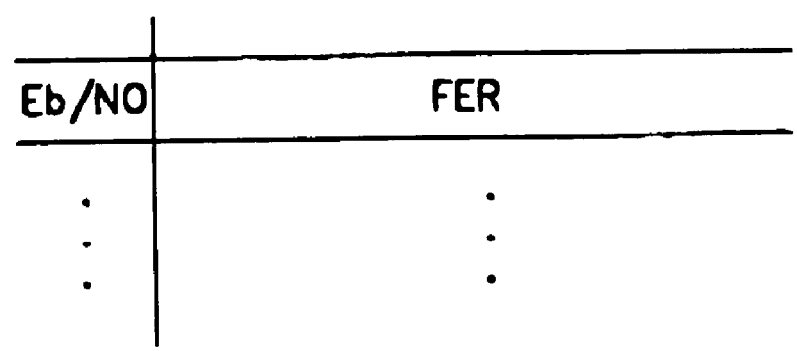
FIG. 14B is an example of a table tabulating SNR versus FER.

In FIG. 10B, the frame error detector includes a frame error estimator 1003, a random number generator 1001, a look-up table 1004, and a switch 1005. The look-up table 1004 tabulates FERs versus SNRs ($E_b/N_t$) as shown in FIG. 14B. The random number generator 1001 generates a random number NR under the control of the frame error estimator 1003. As shown in FIG. 14A, the random numbers range from 0 to 1. The frame error estimator 1003, receives an SNR from the SNR calculator (813 or 919), adds a predetermined offset value to the SNR to achieve a real SNR, reads an FER corresponding to the resulting SNR with the offset (dB) added from the look-up table 1004, and stores the FER in a buffer (not shown). Then, the frame error estimator 1003 controls the random number generator 1001 to generate a random number and determines whether the generated random number is greater than the stored FER. If the random number is not smaller than the FER, the frame error estimator 1003 considers that no frame errors have occurred and outputs a frame error message '0' to the outer-loop power controller (825 or 931). If the random number is smaller than the FER, the frame error estimator 1001 considers that frame errors have been generated and outputs a frame error message '1' to the outer-loop power controller. The switch 1005 is switched by the frame existence flag message received from the frame detector (823 or 927). If the frame existence flag message is 1, the switch 1005 is switched to the CRC error check result and if it is 0, the switch 1005 is switched to the frame error estimator 1003.

Figure 11:
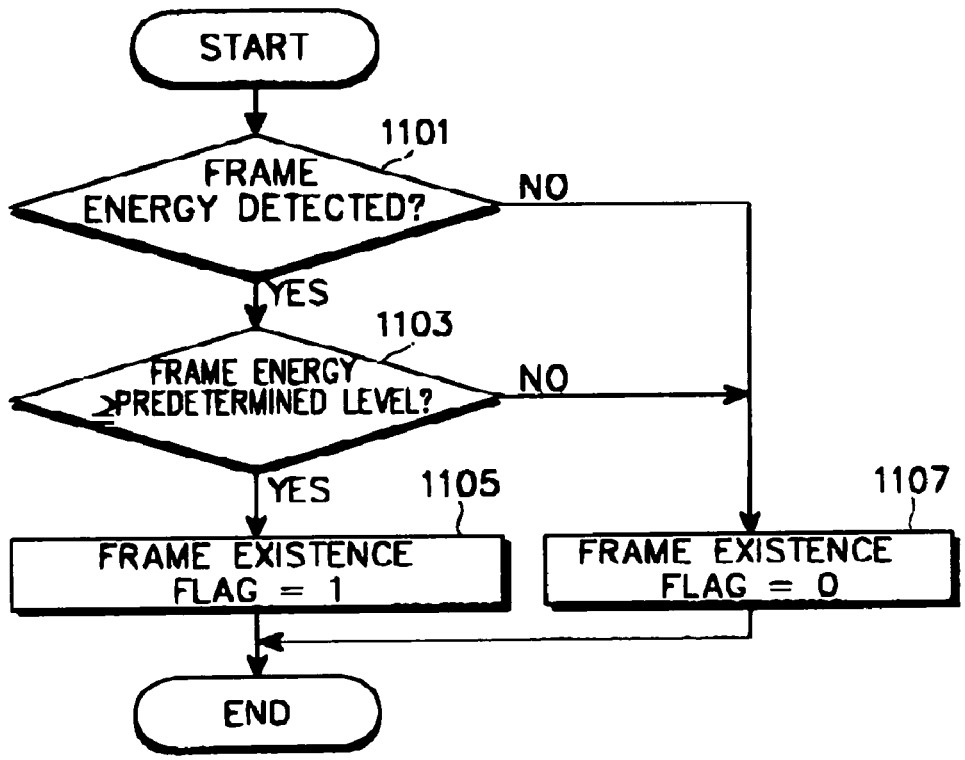
FIG. 11 is a flowchart illustrating a continuous outer-loop power control method using frame energy while in DTX mode.

FIG. 11 is a flowchart illustrating the operation of the data detector (823 or 927) for switching the switch 1005 shown in FIG. 10B.

Referring to FIG. 11, the data detector 823 determines whether frame energy has been received from the frame detector 822 in step 1101. Upon receipt of the frame energy, the data detector 823 determines whether the frame energy is a predetermined level or greater in step 1103. If it is, the data detector 823 outputs a frame existence flag set to 1 to the switch 1005 in step 1105. If the frame energy is smaller than the predetermined level, the data detector 823 outputs the frame existence flag set to 0 to the switch 1005 in step 1107.

Figure 12A:
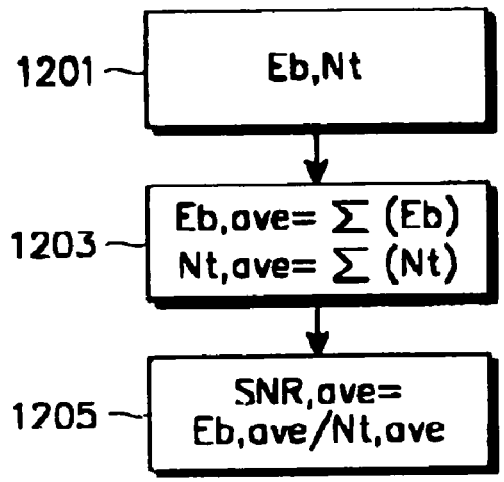
FIGS. 12A and 12B are flowcharts illustrating SNR measuring methods for power control according to an embodiment of the present invention.
Figure 12B:
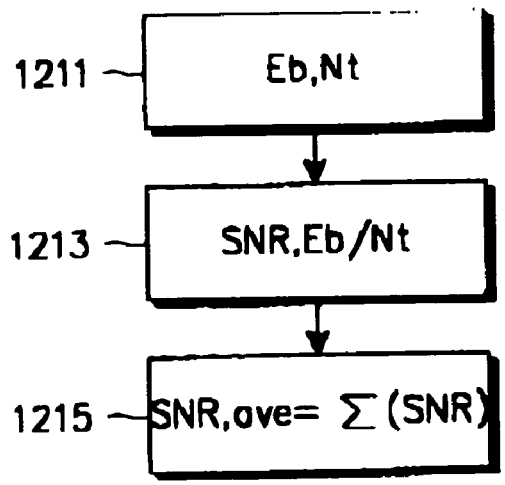

FIGS. 12A and 12B illustrate embodiments of a method of measuring the SNR for one frame in the frame error estimator 1003 shown in FIG. 10B. In the first embodiment, upon receipt of $N_t$ and $E_b$ in PCG units in step 1201, the frame error estimator 1003 obtains an average $E_b$ ($E_b$, ave) and an average $N_t$ ($N_t$, ave) for the entire frame in step 1203 and calculates an average SNR (SNR, ave) from $E_b$, ave and $N_t$, ave in step 1205. In the second embodiment, the frame error estimator 1003 calculates an SNR (=Eb/Nt) for each PCG in step 1213 and an average SNR (SNR, ave) for one frame in step 1215. The average SNR in the first and second embodiments can be calculated respectively by $$SNR_{ave} = \frac{E_b(1) + E_b(2) + \ldots + E_b(N)}{N_t(1) + N_t(2) + \ldots + N_t(N)} \quad (1)$$

$$SNR_{ave} = \left(\frac{E_b(1)}{N_t(1)} + \frac{E_b(2)}{N_t(2)} + \ldots + \frac{E_b(N)}{N_t(N)}\right) \Big/ N \quad (2)$$

where N is the number of PCGs in one frame.

The SNR of one frame can be calculated in other ways.

If no frames have been received, a frame error can be estimated in many ways, which will be described below.

Figure 13:
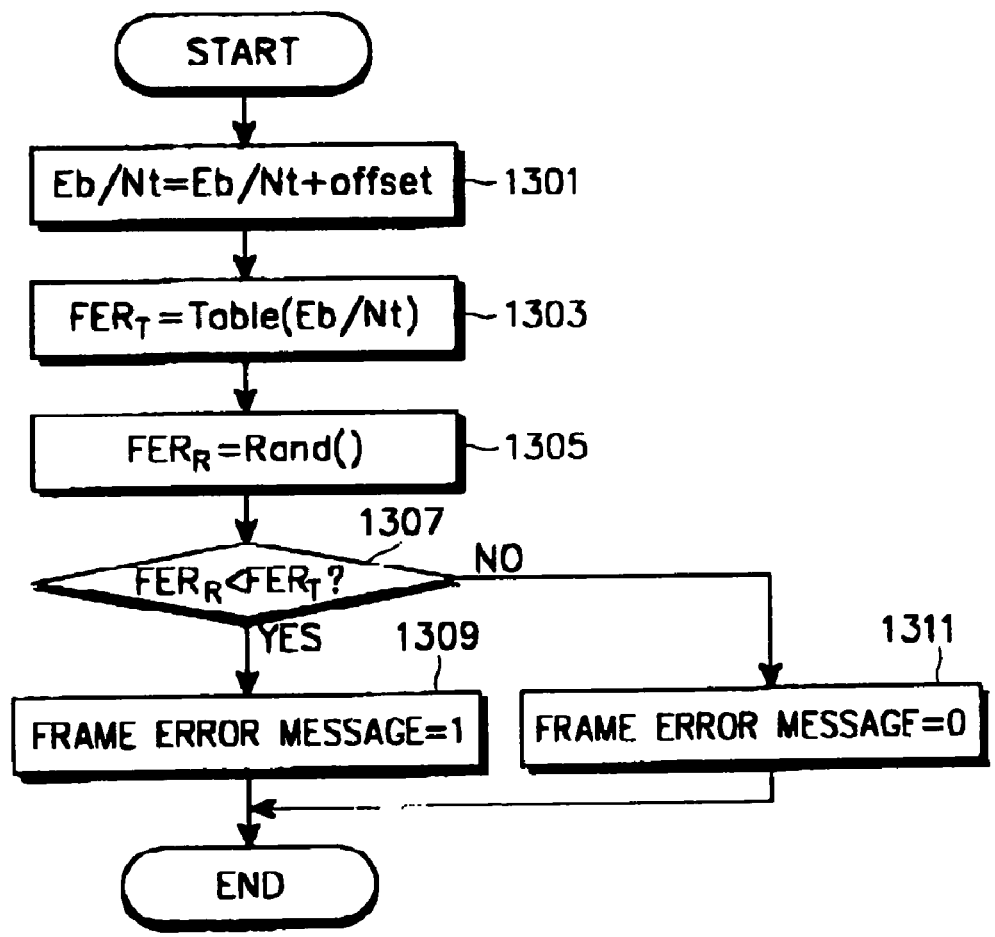
FIG. 13 is a flowchart illustrating a first embodiment of a frame error estimating method when no frames are transmitted according to the present invention.

FIG. 13 is a flowchart illustrating an embodiment of a frame error estimation method when no frames have been received. Referring to FIG. 13, the frame error detector 824 calculates an effective SNR by adding an offset value to an SNR calculated by $E_b/N_t$ in step 1301. Since the measured SNR is different from an SNR on the look-up table to some extent, this difference is compensated for by the offset.

In step 1303, the frame error detector 824 reads an FER ($FER_T$) corresponding to the SNR from the look-up table 1004 and stores the FER in the buffer. In the look-up table, FERs are listed with respect to SNRs. Here, the SNRs or the FERs can be arranged in predetermined intervals. In step 1305, the frame error estimator 1003 controls the random number generator 1001 to generate a random number ($FER_R$). Upon receipt of the random number, the frame error estimator 1003 compares the random number with $FER_T$ in step 1307. If the random number is smaller than $FER_T$, the frame error estimator 1003 outputs a frame error message '1' to the outer-loop power controller 825 in step 1309. If the random number is not smaller than $FER_T$, the frame error estimator 1003 outputs a frame error message '0' to the outer-loop power controller 825 in step 1311.

FIG. 14A illustrates the range of random numbers generated with the same probability by the random number generator. In FIG. 14A, the marked portion indicates a uniform distribution of random numbers.

The table shown in FIG. 14B is made by calculating FERs versus SNRs in an additive white Gaussian noise (AWGN) channel environment. It is obvious that the table can be formed in other ways. An example of the FER tables in the AWGN channel environment is shown below. Here, the table size (i.e., the number of rows in the table) is 51.

TABLE 1

| $E_b/N_t$ | FER | $E_b/N_t$ | FER | $E_b/N_t$ | FER |
| --- | --- | --- | --- | --- | --- |
| 0.3526351 | 1.00000 | 0.7542624 | 0.53400 | 1.116122 | 0.02770 |
| 0.395774 | 0.99985 | 0.7719902 | 0.48465 | 1.141607 | 0.02005 |
| 0.4440143 | 0.99875 | 0.7899071 | 0.43265 | 1.167789 | 0.01605 |
| 0.4982825 | 0.99135 | 0.8078966 | 0.38990 | 1.195200 | 0.01160 |
| 0.5585475 | 0.96535 | 0.8269369 | 0.33690 | 1.224042 | 0.00925 |
| 0.5722369 | 0.95460 | 0.8457570 | 0.29075 | 1.253012 | 0.00655 |
| 0.5857184 | 0.93990 | 0.8651410 | 0.25510 | 1.279466 | 0.00475 |
| 0.5992779 | 0.91860 | 0.8853381 | 0.21730 | 1.309758 | 0.00405 |
| 0.6131983 | 0.89565 | 0.9066824 | 0.18165 | 1.340756 | 0.00295 |
| 0.6271264 | 0.87260 | 0.9268867 | 0.15640 | 1.372266 | 0.00265 |
| 0.6411836 | 0.84195 | 0.9492299 | 0.12670 | 1.404932 | 0.00205 |
| 0.6566134 | 0.80610 | 0.9709564 | 0.10860 | 1.437564 | 0.00125 |
| 0.6721940 | 0.77020 | 0.9933405 | 0.08365 | 1.504922 | 0.00075 |
| 0.6873548 | 0.72735 | 1.0175930 | 0.06525 | 1.575093 | 0.00055 |
| 0.7036301 | 0.67650 | 1.0406720 | 0.05500 | 1.649691 | 0.00010 |
| 0.7196916 | 0.63775 | 1.0645000 | 0.04285 | 1.726815 | 0.00005 |
| 0.7370404 | 0.58535 | 1.0900130 | 0.03605 | 1.769792 | 0.00000 |

The size of Table 1 can be changed when necessary. SNRs and FERs can be arranged at predetermined intervals. A mobile station acquires the table in many ways. Hereinbelow three of them will be described.

(1) A base station transmits the table to the mobile station on a common channel like a broadcast channel and then the mobile station stores it in a look-up table storage.

(2) The base station transmits the table to the mobile station on a dedicated channel which transmits a power control message and then the mobile station stores it in the look-up table storage.

(3) The look-up table is stored in an internal memory of the mobile station in a manufacturing process.

Meanwhile, offset values used to compensate SNR measurements vary with radio configurations (RCs), that is, code rates, and gating rates. Offset values versus gating rates in a specific RC can be listed as shown below.

TABLE 2

| gating rate | offset (dB) |
| --- | --- |
| 1 | −0.8 |
| ½ | −1.2 |
| ¼ | −1.8 |
| ⅛ | −3.0 |

Such a table as Table 2 can be given for each RC. The mobile station can acquire the above table in many ways. Four of them will be presented below.

(1) A base station transmits the table to the mobile station on a common channel like a broadcast channel and then the mobile station stores it in an offset table storage.

(2) The base station transmits the table to the mobile station on a dedicated channel which transmits a power control message and then the mobile station stores it in the offset table storage.

(3) The base station transmits a state transition command message including an offset for corresponding state transition to the mobile station and the mobile station applies the offset.

(4) The offset table is stored in an internal memory of the mobile station in a manufacturing process and a corresponding offset is applied according to state transition.

Figure 15:
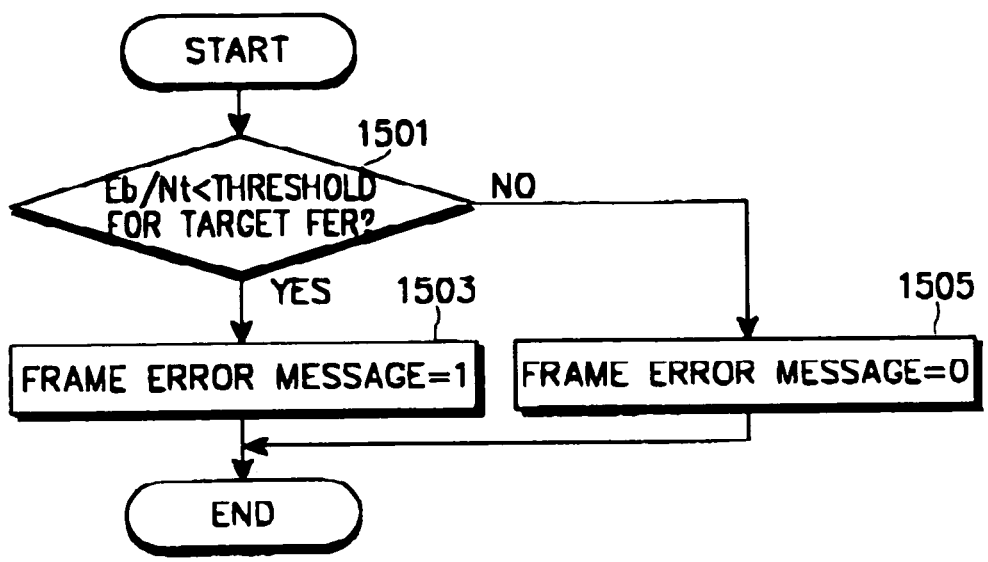
FIG. 15 is a flowchart illustrating a second embodiment of a frame error estimating method when no frames are transmitted according to the present invention.

FIG. 15 is a flowchart illustrating another embodiment of the frame error estimation method when no frames have been received. In the second embodiment, a frame error is estimated by comparing an SNR measured in frame units with a fixed threshold or an externally received threshold. That is, if the measured SNR is smaller than the threshold, it is determined that frame errors have been generated. If the SNR is greater than the threshold, it is determined that no frame errors have been generated. The comparison is performed in step 1501. The frame error estimator 1003 outputs the estimate to the outer-loop power controller 825 in steps 1503 and 1505

The threshold in the second embodiment is changed according to RCs and gating rates. Thresholds versus gating rates in a specific RC are listed below.

TABLE 3

| gating rate | threshold |
| --- | --- |
| 1 | 0.7 |
| ½ | 0.61 |
| ¼ | 0.53 |
| ⅛ | 0.49 |

Such a table as Table 3 can be made for each RC. The mobile station can acquire the above table in many ways. Four of them will be presented below.

(1) The base station transmits the table to the mobile station on a common channel like a broadcast channel and then the mobile station stores it in a threshold table storage.

(2) The base station transmits the table to the mobile station on a dedicated channel which transmits a power control message and then the mobile station stores it in the threshold table storage.

(3) The base station transmits a state transition command message including a threshold for each corresponding state transition to the mobile station and the mobile station applies the threshold.

(4) The threshold table is stored in an internal memory of the mobile station in a manufacturing process and a corresponding threshold is applied according to state transition.

Figure 16:
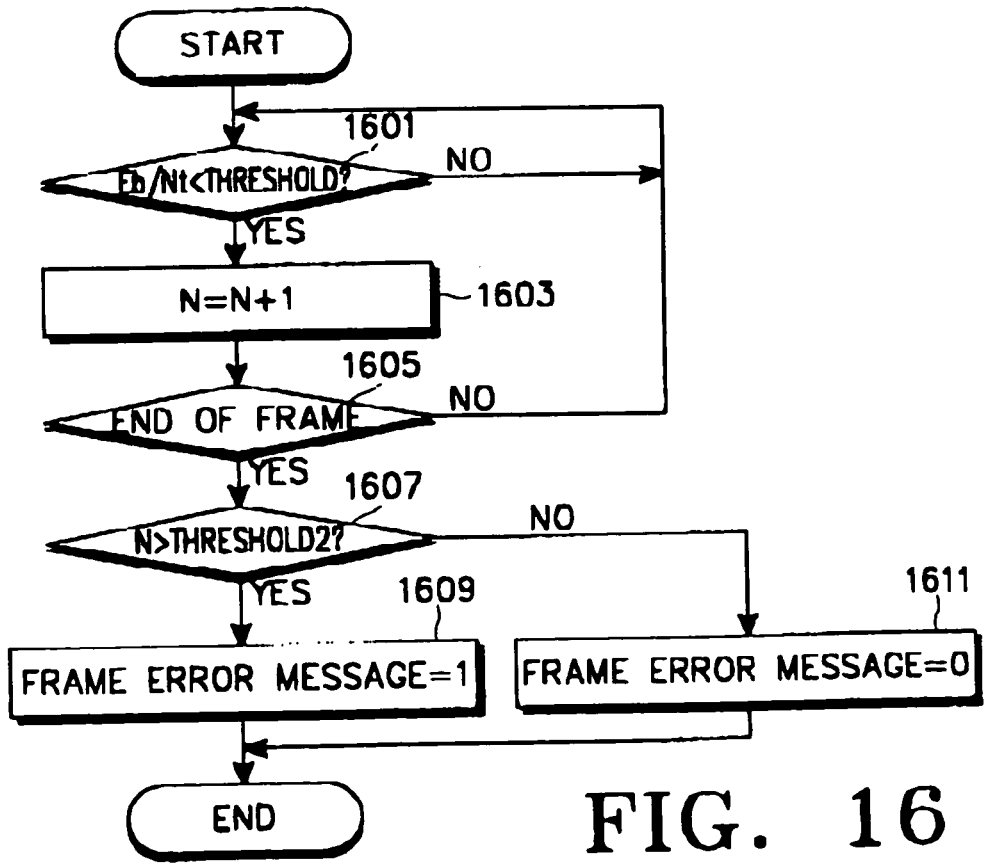
FIG. 16 is a flowchart illustrating a third embodiment of a frame error estimating method when no frames are transmitted according to the present invention.

FIG. 16 is a flowchart illustrating a third embodiment of the frame error estimation method when no frames have been received. In step 1601, the frame error estimator 1003 compares an SNR measured in PCG units with a first threshold or externally received. In step 1603, the frame error estimator 1003 increases by one the count number (N) of SNRs in PCGs smaller than the threshold if the SNR is smaller than the threshold. The frame error estimator 1003 determines whether SNRs are completely measured in all PCGs of one frame in step 1605 and, if they are completely measured, the frame error estimator 1003 compares the count value (N) with a second threshold (Threshold2) in step 1607. If the count value is greater than the second threshold in step 1607, the frame error estimator 1003 determines that frame errors have occurred and outputs a frame error message '1' to the outer-loop power controller 825 in step 1609. If the count value is not greater than the second threshold in step 1607, the frame error estimator 1003 considers that no frame errors have been generated and outputs a frame error message '0' to the outer-loop power controller 825 in step 1611. The thresholds can be preset or received from the transmitter in advance.

The thresholds used in the above third embodiment vary with RCs and gating rates. A method of making a threshold table for the third embodiment and acquiring the threshold table in the mobile station is the same as that in the second embodiment.

The mobile station can acquire the threshold table in many ways. Three of them will be presented below.

(1) The base station transmits the table to the mobile station on a common channel such as a broadcast channel and then the mobile station stores it in a threshold table storage.

(2) The base station transmits the table to the mobile station on the dedicated channel that transmits a power control message and then the mobile station stores it in the threshold table storage.

(3) The threshold table is stored in an internal memory of the mobile station in a manufacturing process and a corresponding threshold is applied.

FIG. 17 illustrates gated transmission while in DTX mode according to an embodiment of the present invention. Case 8-1 shows transmission at a gating rate of 1, case 8-3 shows transmission at a gating rate of ½, and case 8-5 shows transmission at a gating rate of ¼. PCBs are also gated at a corresponding gating rate on a forward link. Even though gating occurs, the same effects as produced from a no-gated transmission case are observed except that the number of PCBs to be calculated is reduced. Therefore, the above-described outer-loop power control methods can be applied to the gated mode. That is, the method of changing a threshold by adapting an outer-loop power control based on the determination whether a real frame error is present or not only in a frame transmission period can be applied to the gated mode, and the method of performing an outer-loop power control using the determination whether a real frame error is present or not in a frame transmission period and estimating the presence or absence of a frame error in a non-frame transmission period can be applied to the gated mode. Or the outer-loop power control may not be applied in the gated mode.

Figure 20:
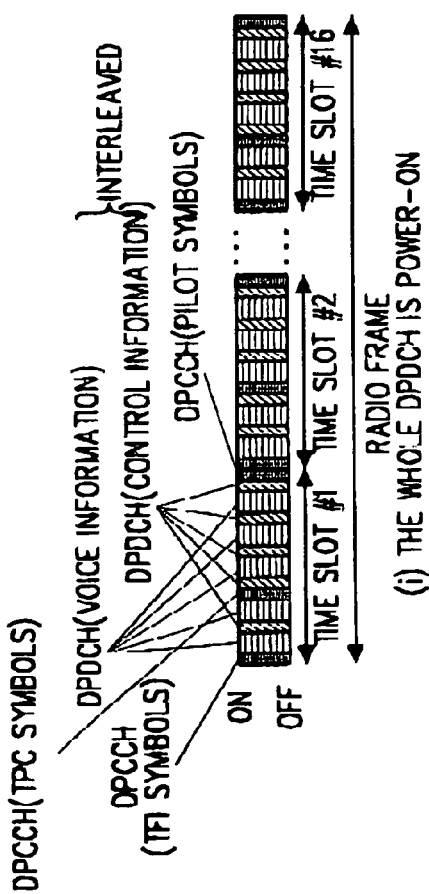
FIG. 20 illustrates the structure of a DPDCH on which frames are transmitted asynchronously in a DTX mode.

FIG. 20 illustrates transmission of a DPCH while in DTX mode in an asynchronous Japanese and European IMT-2000 system. DPCHs include a DPDCH for data transmission and a DPCCH for recovering the DPDCH. The DPDCH in turn includes a DCCH for logic control and a DTCH (Dedicated Traffic Channel) for transmission of voice information. The DPCCH has a pilot symbol for providing channel information and a TPC (Transmission Power Control) for power control. There are four cases in the figure: (i) transmission of both the DPDCH and the DPCCH; (ii) non-transmission of DCCH information; (iii) non-transmission of DTCH; and (iv) transmission of DPCCH only without DPDCH. It is noted from the four cases that the DPCCH is continuously transmitted. Therefore, a continuous outer-loop power control is possible using pilot symbols of the DPCCH, as stated before.

Figure 18A:
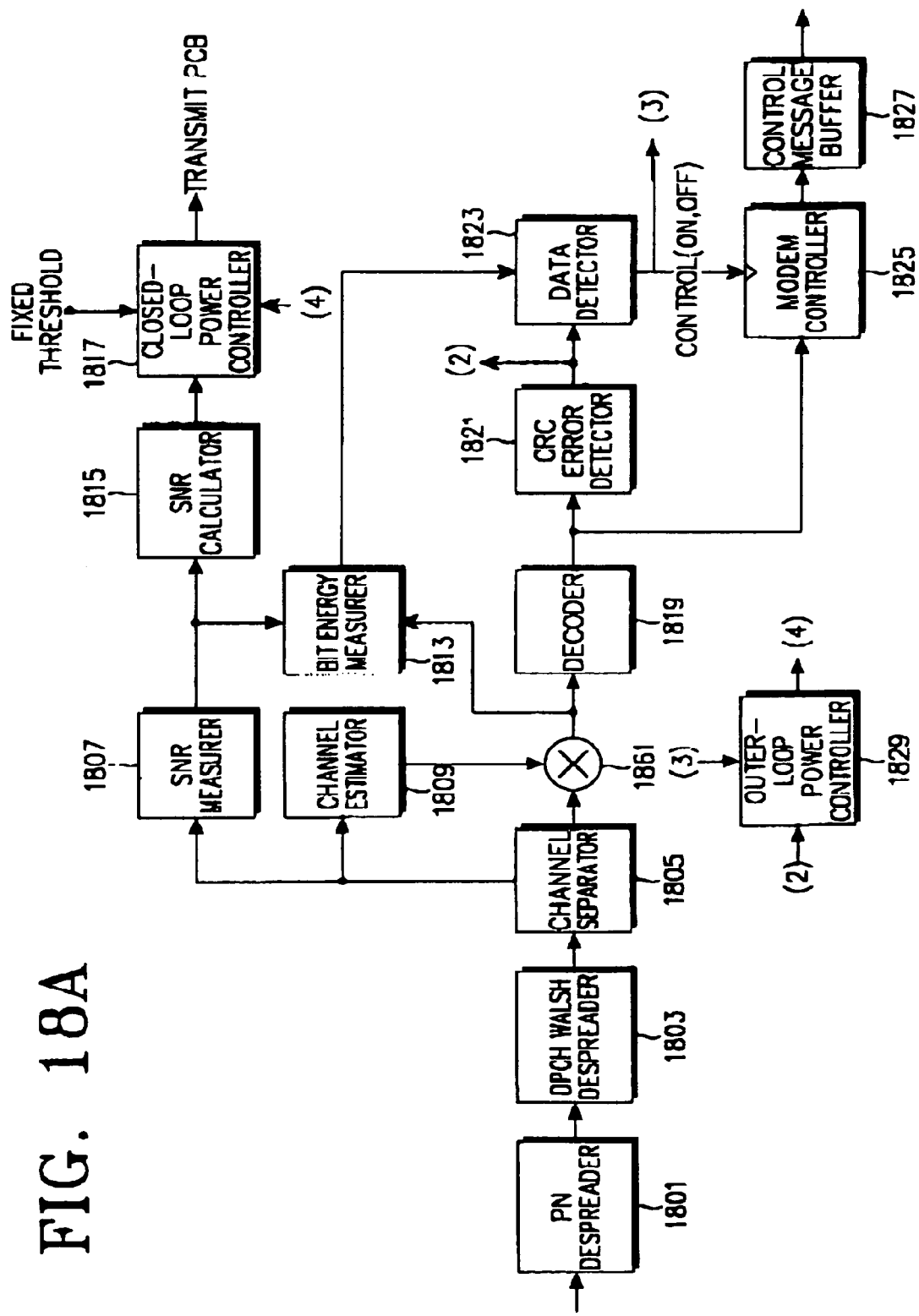
FIG. 18A is a block diagram of a reverse link receiver of a typical asynchronous DPCH in DTX mode.
Figure 19A:
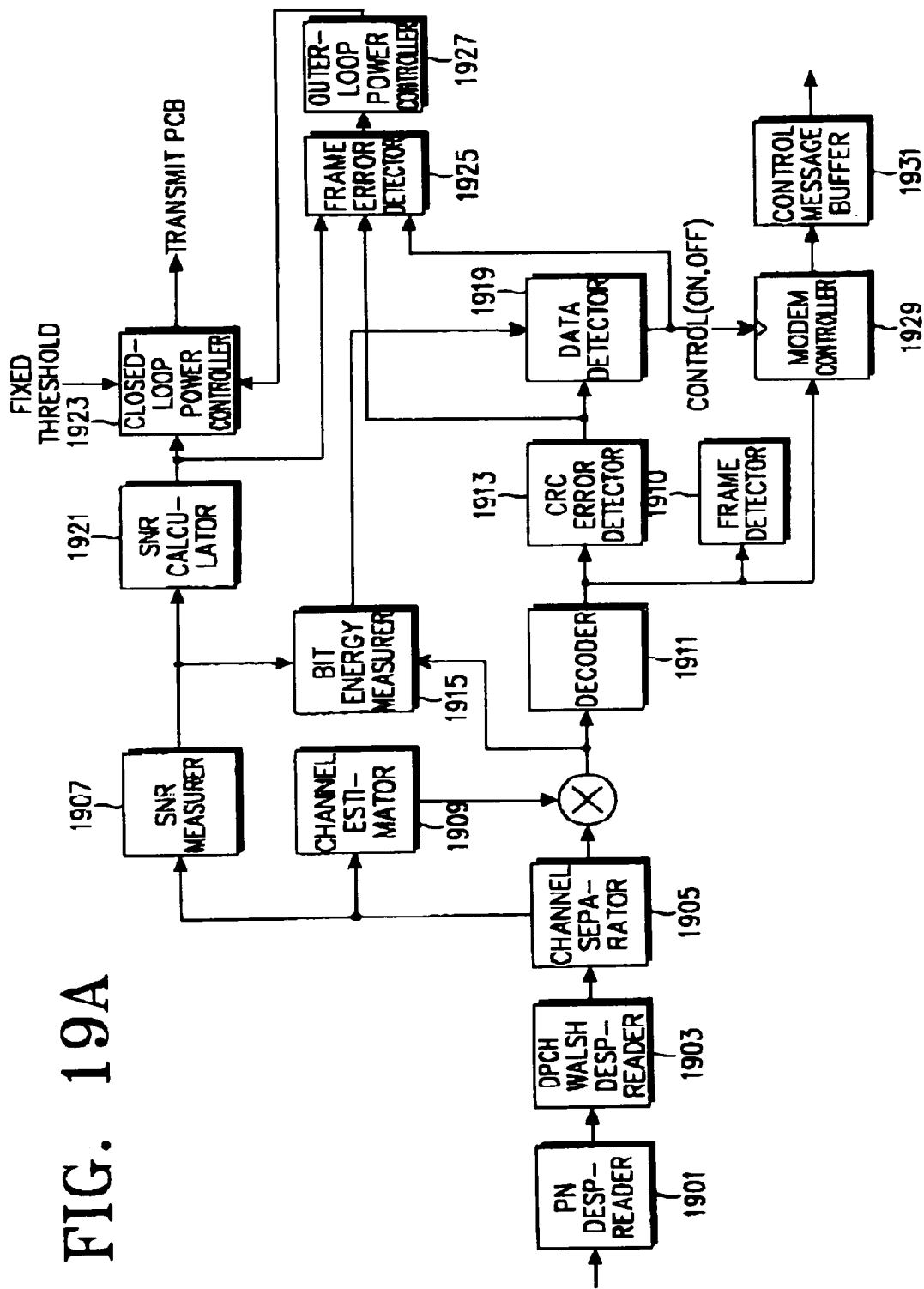
FIG. 19A is a block diagram of an embodiment of a reverse link receiver for outer-loop power control in a DTX mode of an asynchronous DPCH according to the present invention.

FIG. 19A is a block diagram of an embodiment of a reverse link receiver which performs continuous outer-loop power control on a DPCH while in DTX mode in an asynchronous IMT-2000 system according to the present invention. The receiver is different from that shown in FIG. 18A in that a frame error detector 1925 and an outer-loop power controller 1927 are further provided. The frame error detector 1925 outputs frame error information to the outer-loop power controller 1927, for the input of an SNR, a CRC error check result, and information about the presence or absence of data (DPDCH). The operation of the frame error detector 1925 is shown in FIGS. 10 and 11, and the operation of the outer-loop power controller 1925 in FIG. 7.

Figure 18B:
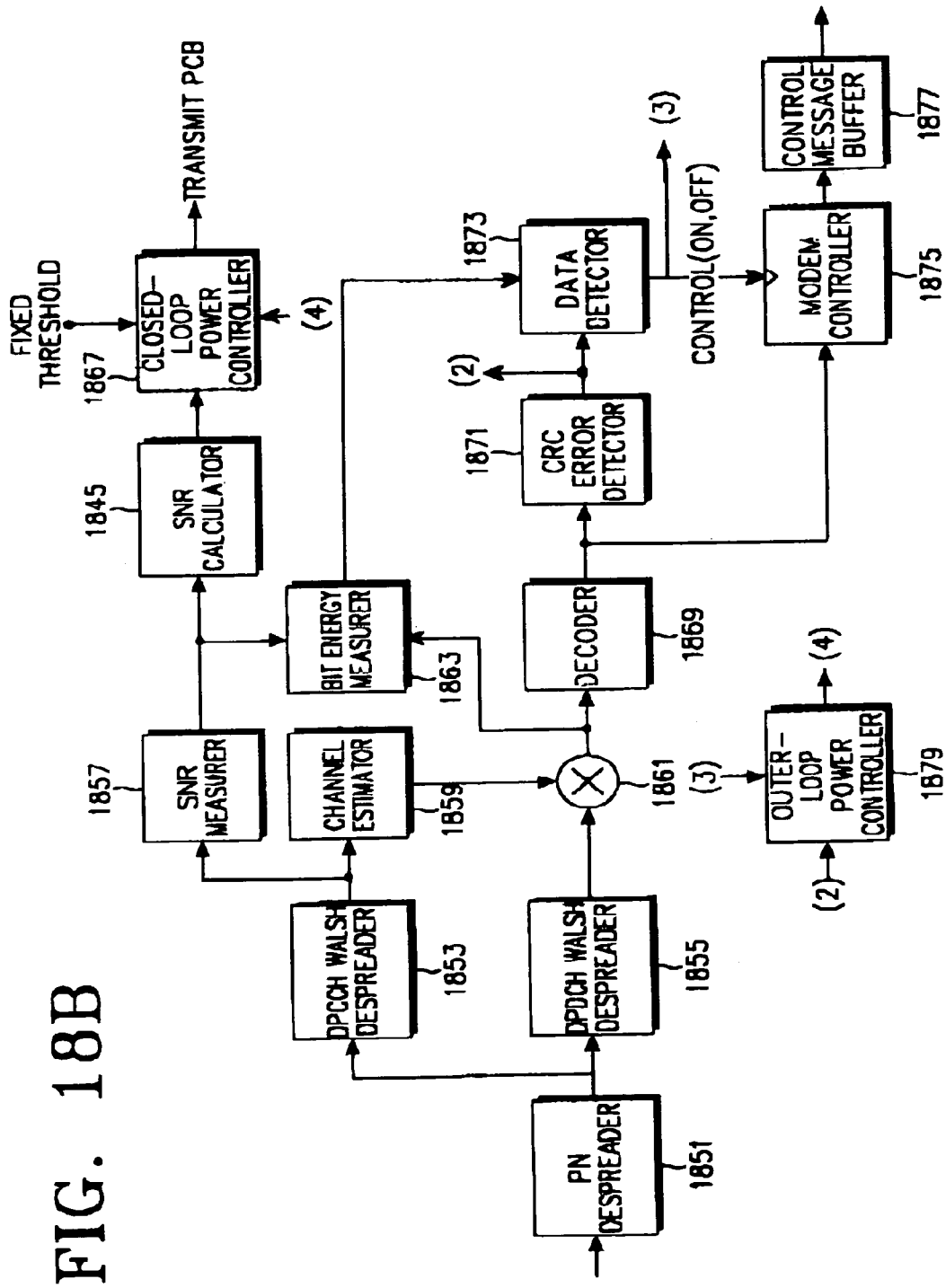
FIG. 18B is a block diagram of a forward link receiver of a typical asynchronous DPCH in DTX mode.
Figure 19B:
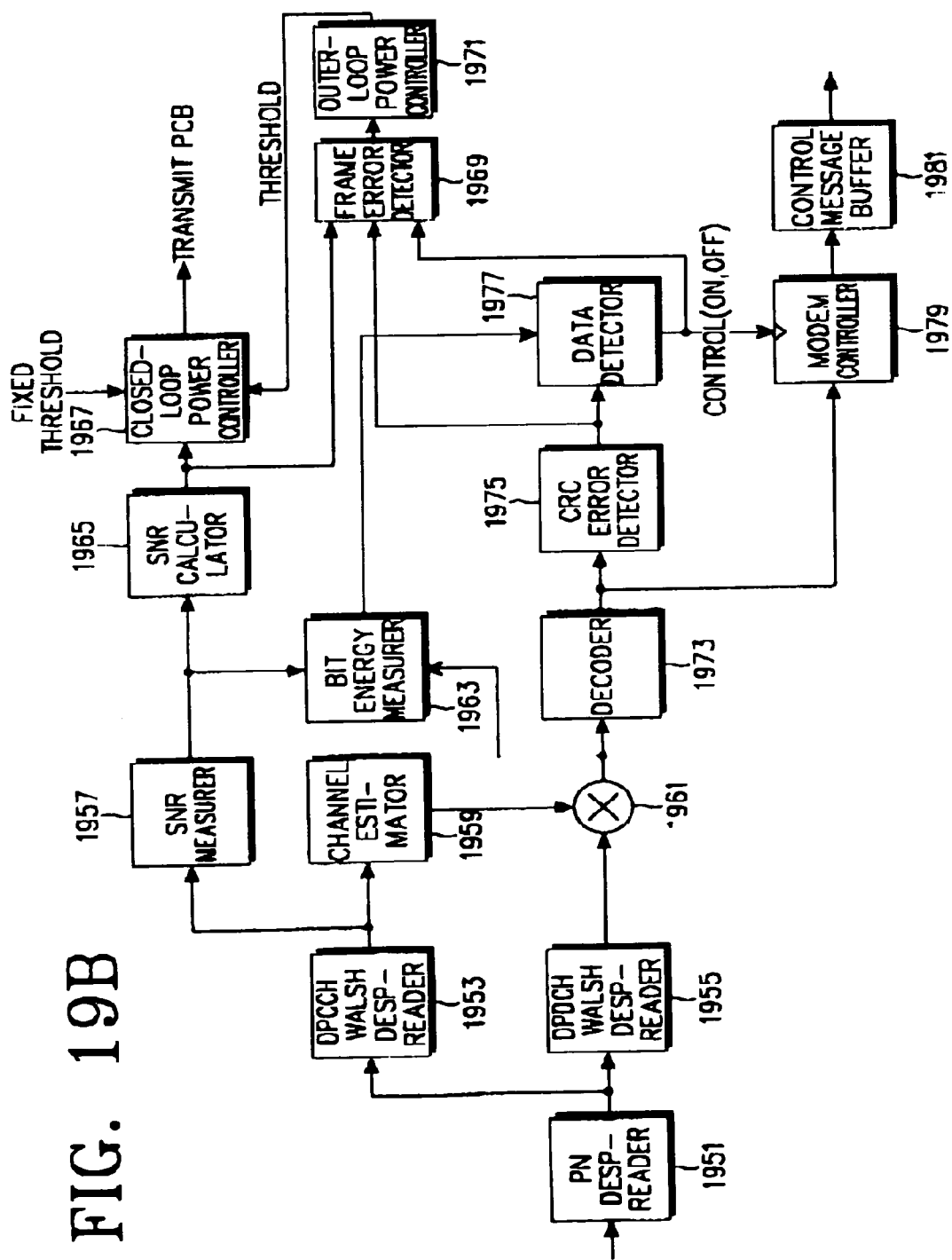
FIG. 19B is a block diagram of an embodiment of a forward link receiver for outer-loop power control in a DTX mode of an asynchronous DPCH according to the present invention.

FIG. 19B is a block diagram of an embodiment of a forward link receiver which performs continuous outer-loop power control on a DPCH while in DTX mode in an asynchronous IMT-2000 system according to the present invention. The receiver is different from that shown in FIG. 18B in that a frame error detector 1969 and an outer-loop power controller 1971 are further provided. The frame error detector 1969 outputs frame error information to the outer-loop power controller 1971, for the input of an SNR, a CRC error check result, and information about the presence or absence of data (DPDCH). The operation of the frame error detector 1969 has been described in connection with FIGS. 10 and 11, and the operation of the outer-loop power controller 1971 in connection with FIG. 7.

As described above, data communication is conducted in several states according to the communication environment. For example, there are multiple states, including a packet signal transmission state, a control signal only transmission state, and a state where neither a packet signal nor a control signal is transmitted. In the first two states, transmission power is controlled by closed-loop power control and outer-loop power control.

A packet signal is transmitted according to a data communication state as stated above. Data communication in an IMT-2000 system is comprised of an active state, a control hold state, a dormant state, and so on. The above-described transmission control method is used in the active state and the control hold state. Specifically, a pilot signal and PCBs are transmitted in a gated mode in the control hold state. According to gating rates ½, ¼, and ⅛, many states can be defined. This is also applied to an active state and a control hold state in an asynchronous IMT-2000 system.

Power control at a gated transmission mode in the communication states and the control hold state can be implemented in the following two embodiments.

First Embodiment

When a communication state transitions to another communication state, a threshold in the previous state is maintained in the transitioned state and then changed to a new threshold fit for the transitioned state through an outer-loop power control operation. For example, if a threshold incrementing step is predetermined and the difference between a threshold before state transition and a threshold after state transition is greater than the step size, an outer-loop power controller changes the previous threshold to the threshold for the transitioned state in a predetermined time.

Figure 21A:
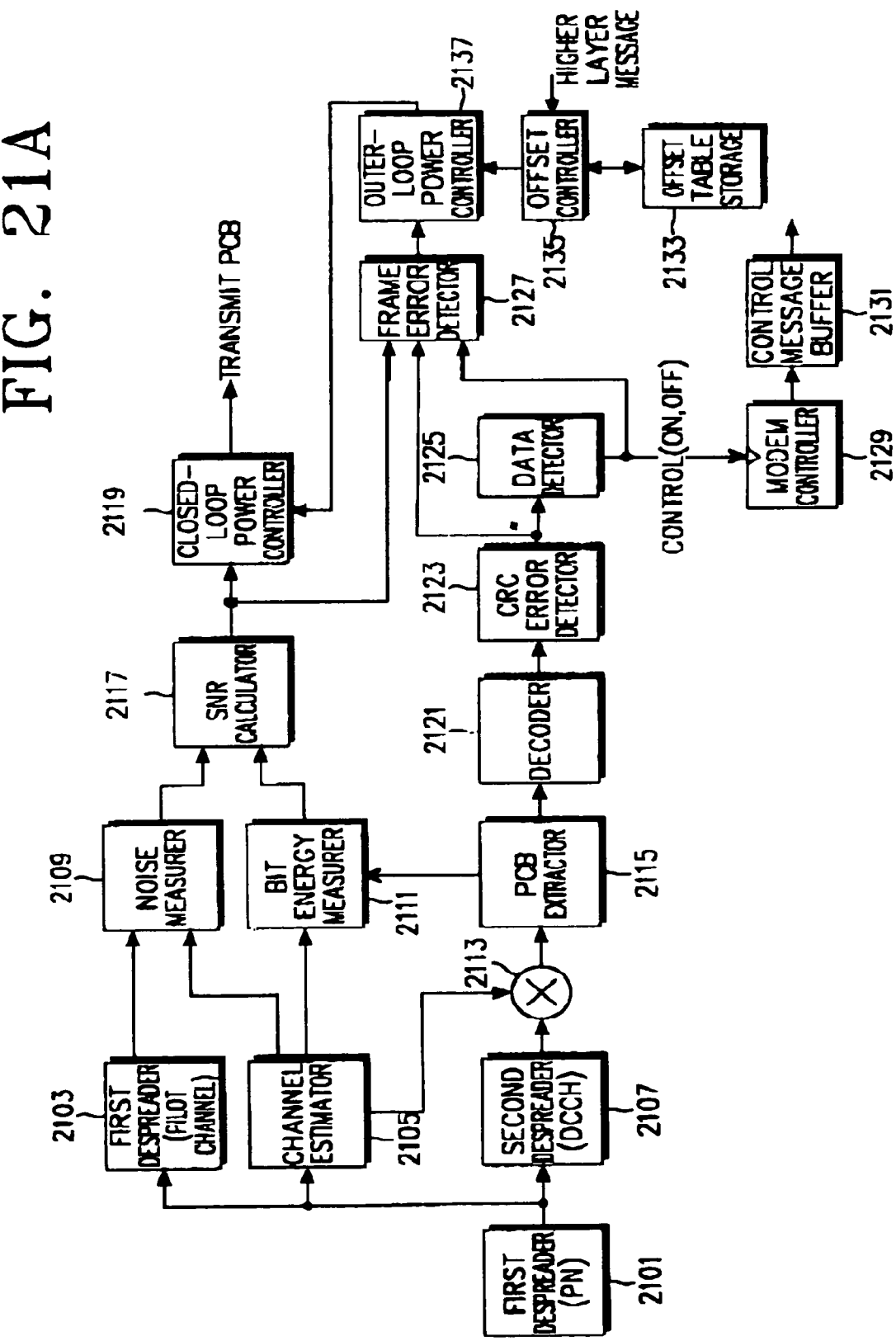
FIG. 21A is a block diagram of an embodiment of a mobile station receiver in a synchronous IMT-2000 system according to the present invention.

FIG. 21A is a block diagram of a mobile station receiver capable of performing outer-loop power control with a reduced time for updating a previous threshold for a transitioned state in a synchronous CDMA mobile communication system according to an embodiment of the present invention. The same components as shown in FIG. 8 will not be described.

An offset table storage 2133 includes an offset table as shown Table 4 in which offsets are listed with respect to pre-transition and post-transition. The offsets are obtained empirically.

TABLE 4

| before transition | after transition | offset (dB) |
|---|---|---|
| active | gating rate ½ | +2.5 |
| active | gating rate ¼ | +3.5 |
| active | gating rate ⅛ | +6.0 |
| gating rate ½ | active | −2.0 |
| gating rate ½ | gating rate ¼ | +1.0 |
| gating rate ½ | gating rate ⅛ | +3.5 |
| gating rate ¼ | active | −3.5 |
| gating rate ¼ | gating rate ½ | −1.0 |
| gating rate ¼ | gating rate ⅛ | +2.5 |
| gating rate ⅛ | active | −6.0 |
| gating rate ⅛ | gating rate ½ | −3.5 |
| gating rate ⅛ | gating rate ¼ | −2.5 |

Table 4 can be made for each RC.

The reason for the difference in value and sign between the offsets for transition of an active state to a ½ gated transmission state and for transition of the ½ gated transmission state to the active state is that a margin is added to an optimal threshold offset to ensure reception performance in producing a lower threshold with an offset.

The offset table can be obtained in many ways. Four of them will be presented below.

(1) A base station transmits the table to the mobile station on a common channel like a broadcast channel and then the mobile station stores it in an offset table storage.

(2) The base station transmits the table to the mobile station on a dedicated channel which transmits a power control message and then the mobile station stores it in the offset table storage.

(3) The base station transmits a state transition command message including an offset for corresponding state transition to the mobile station and the mobile station applies the offset. In this method, an offset table is not created at the mobile station. Instead, the base station transmits the offset required for each corresponding state transition.

(4) The offset table is stored in an internal memory of the mobile station in a manufacturing process and a corresponding offset is applied according to state transition.

An offset controller 2135 receives a higher layer message including information about a pre-transition state and a post-transition state from a higher layer processor, reads an offset according to corresponding state transition from the offset table storage 2133, and feeds the offset to an outer-loop power controller 2137. The offset controller 2135 receives an offset table from a base station through an upper layer message and stores it in the offset table storage 2133. The offset controller 2135 stores the received offset table only in an initial state and does not store later received offset tables. Or it updates the offset table in handoff and stores the updated offset table. In addition, if the base station transmits only an offset for the corresponding state transition, the offset controller 2135 detects the offset from a higher layer message and directly output it to the outer-loop power controller 2137.

The outer-loop power controller 2137 adds the offset received from the offset controller 2135 to a pre-transition offset and outputs a fixed threshold to a closed-loop power controller 2119.

Figure 21B:
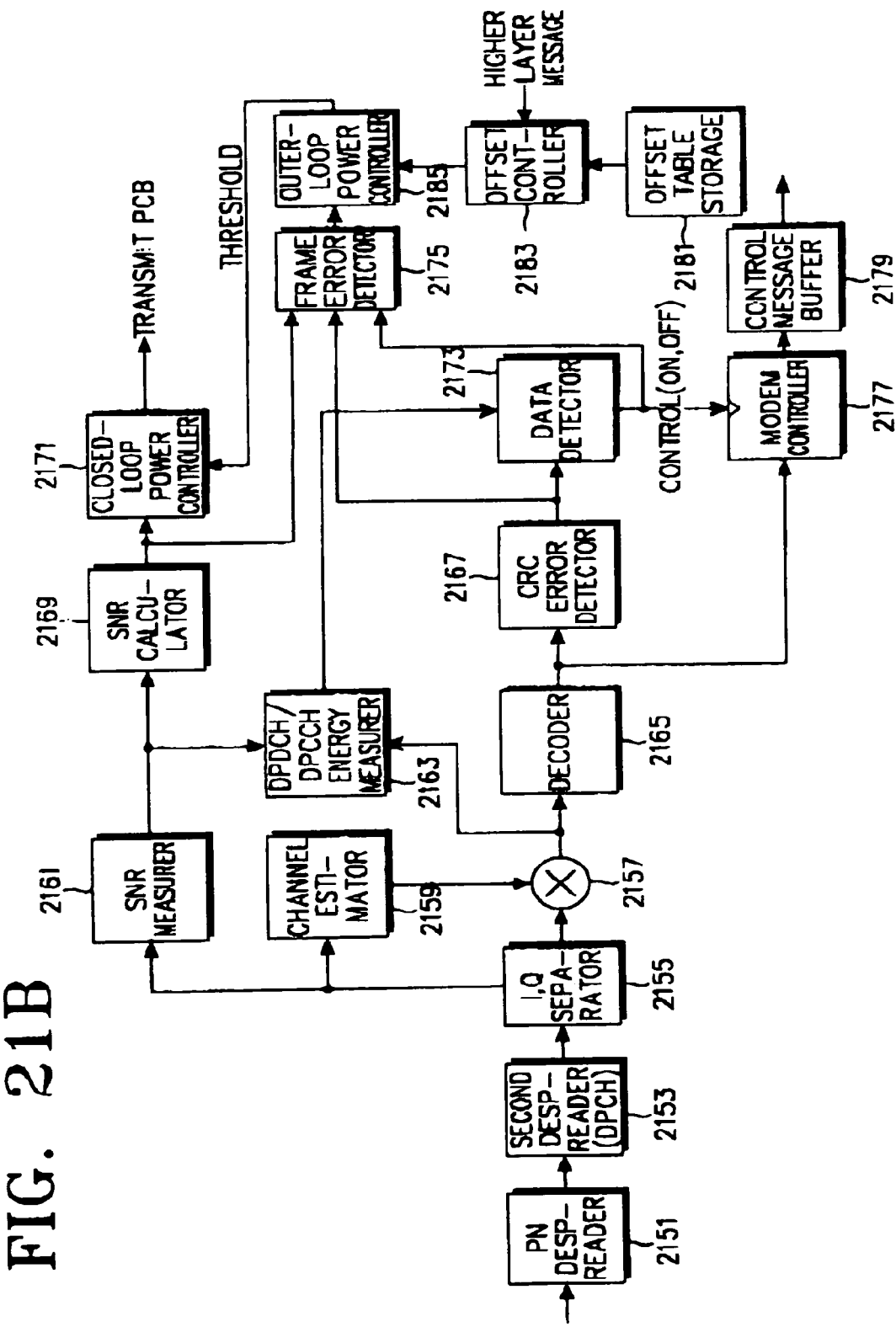
FIG. 21B is a block diagram of an embodiment of a mobile station receiver in an asynchronous IMT-2000 system according to the present invention.

FIG. 21B is a block diagram of a mobile station receiver capable of performing outer-loop power control with a reduced time for updating a previous threshold for a transitioned state in an asynchronous CDMA mobile communication system according to an embodiment of the present invention. The same components as shown in FIG. 8 will not be described.

The mobile station receiver for the asynchronous CDMA mobile communication system is the same on structure as that for the synchronous CDMA mobile communication system shown in FIG. 21A. An offset table storage 2181 includes an offset table as shown in Table 4. Upon receipt of state transition information through an upper layer message from a higher layer processor, the offset table storage 2181 reads a corresponding offset from the offset table and outputs the offset to an outer-loop power controller 2185. Then, the outer-loop power controller 2185 adds the offset received from an offset controller 2183 to a pre-transition threshold and outputs a fixed threshold to a closed-loop power controller 2171.

Figure 22A:
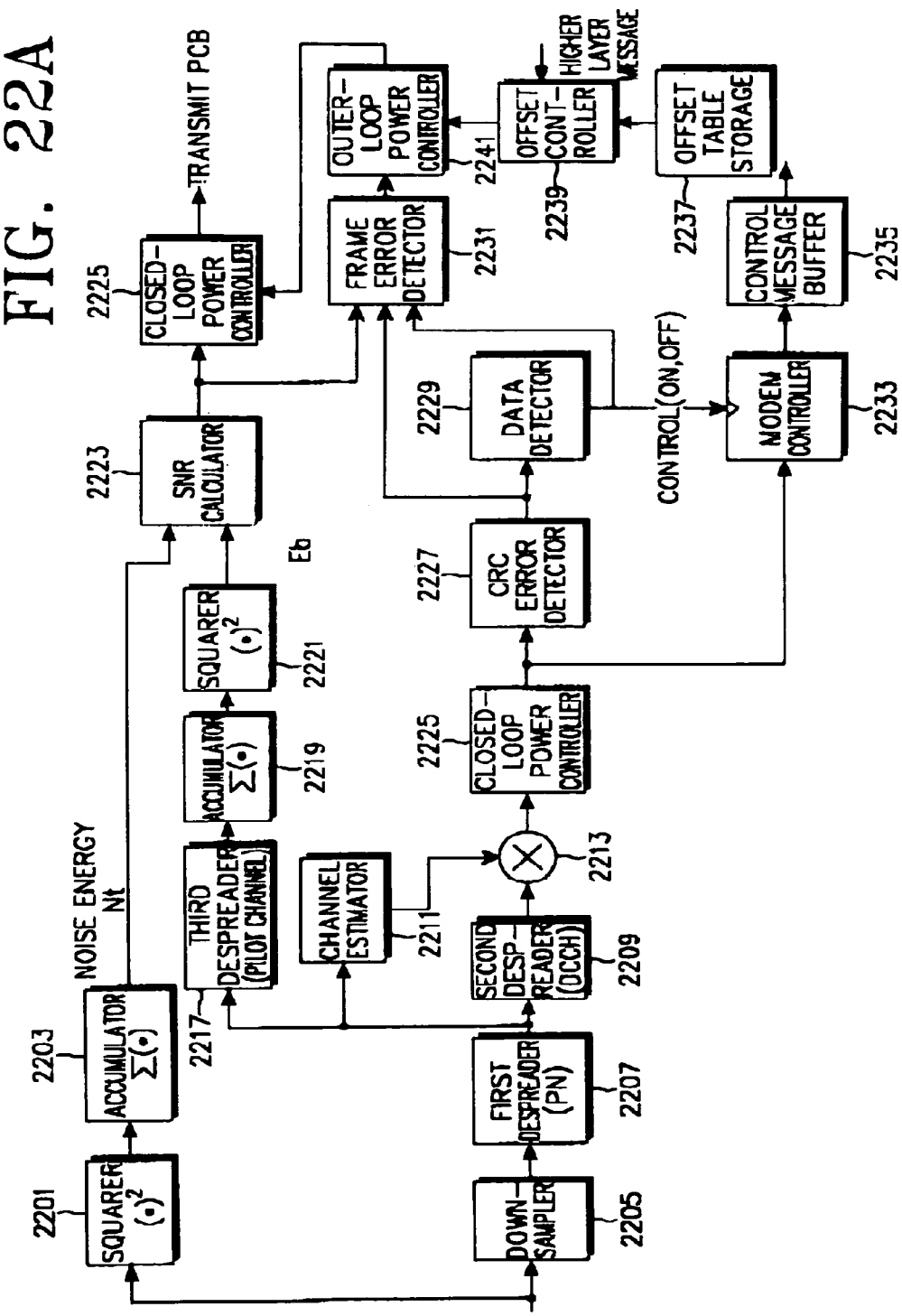
FIG. 22A is a block diagram of an embodiment of a base station receiver in the synchronous IMT-2000 system according to the present invention.

FIG. 22A is a block diagram of a base station receiver in the synchronous IMT-2000 system according to an embodiment of the present invention. The components of the base station receiver except for an offset controller 2239 are the same as those shown in FIG. 9. The offset controller 2239 operates in the same manner as the offset controller 2135 shown in FIG. 21A. An offset table for the offset controller 2239 of the base station is stored in a memory or received from a system network.

Figure 22B:
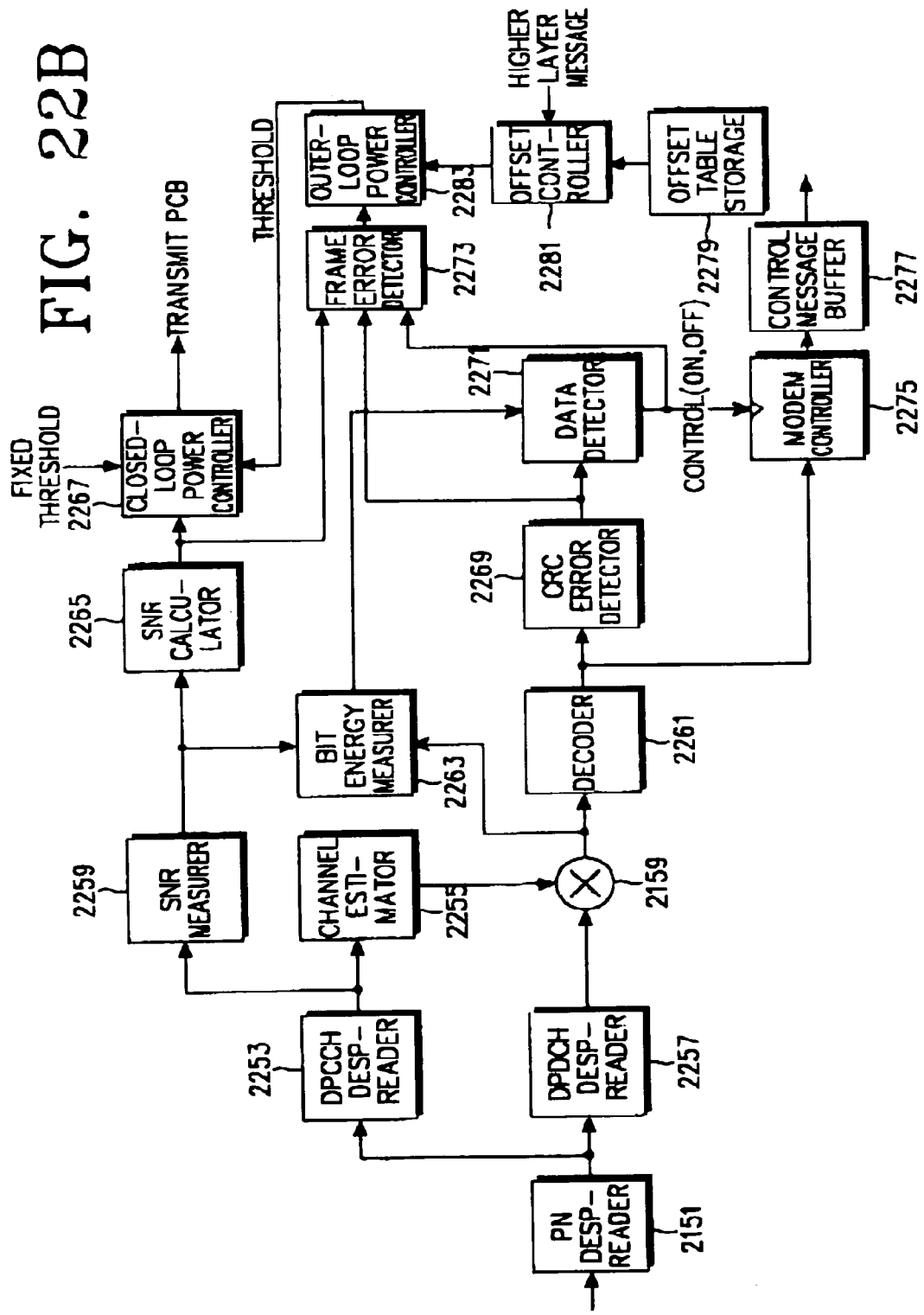
FIG. 22B is a block diagram of an embodiment of a base station receiver in the asynchronous IMT-2000 system according to the present invention.

FIG. 22B is a block diagram of a base station receiver in the asynchronous IMT-2000 system according to an embodiment of the present invention. Due to the nature of the asynchronous IMT-2000 system, the base station receiver operates in the same manner as the mobile station receiver shown in FIG. 21B. An offset controller 2281 operates in the same manner as the offset controller 2183 shown in FIG. 21B. An offset table such as mentioned in reference to FIG. 22A is used.

Second Embodiment

Gated transmission aims at reduction of interference and power consumption by transmitting only a control signal (pilots and PCBs) in a gated mode when no traffic signals to be transmitted exist in a control hold state. Traffic signals to transmit are seldom generated in the control hold state. Accordingly, only control signals are transmitted in a gated mode in most cases. To ensure the reception performance of a traffic signal transmitted in the gated transmission mode, the transmission power of a control signal and the traffic signal should be set higher than in an active state. In an embodiment of the present invention, the transmission power of a control signal transmitted in a gated mode is maintained the same as in an active state. In this state, when a traffic signal to transmit is generated, the gain of the transmission power of the traffic signal is controlled, and, when no traffic signals exist, the transmission power is minimized. Consequently, the reception performance of the traffic signal is ensured.

Figure 1A:
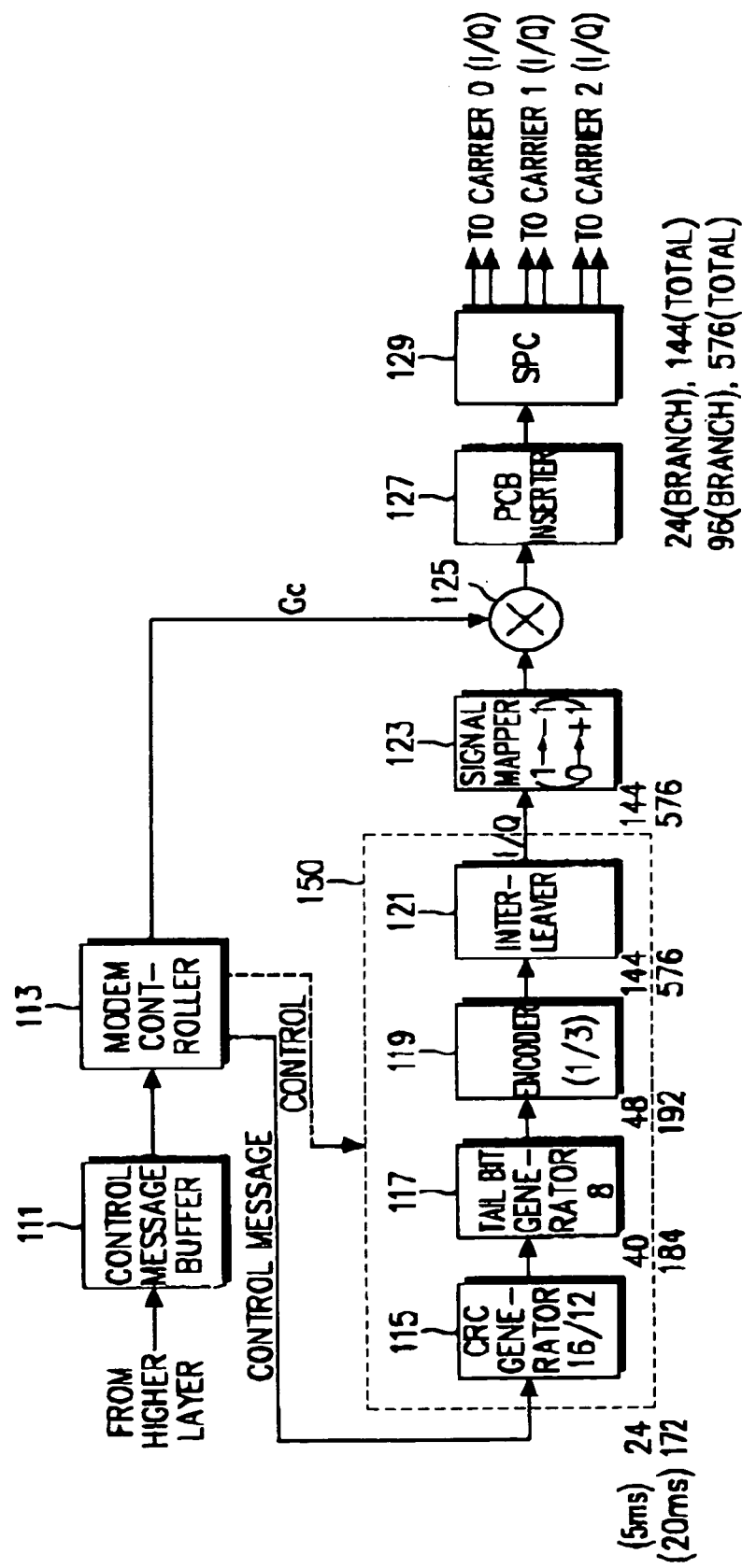
FIGS. 1A and 1B are block diagrams of a forward DCCH transmitter operated in a DTX mode in a conventional CDMA mobile communication system.
Figure 1B:
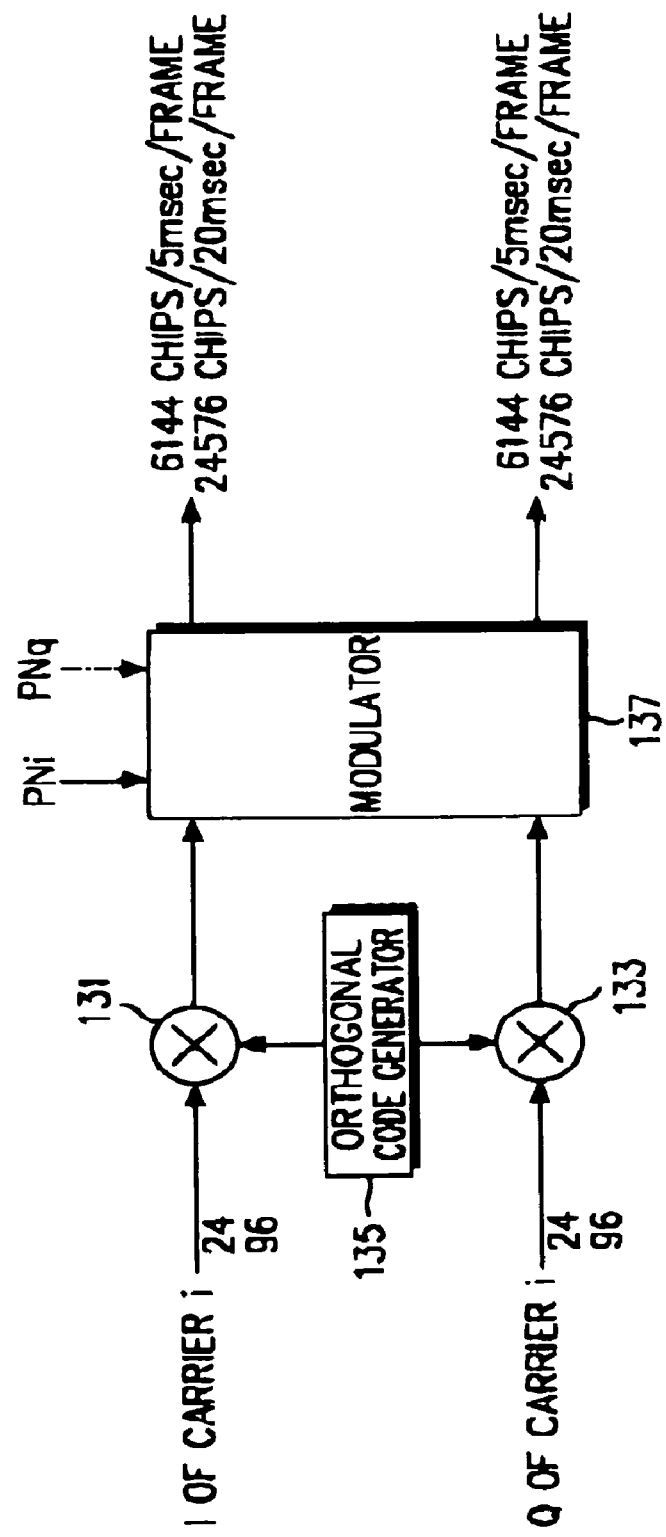
Figure 23:
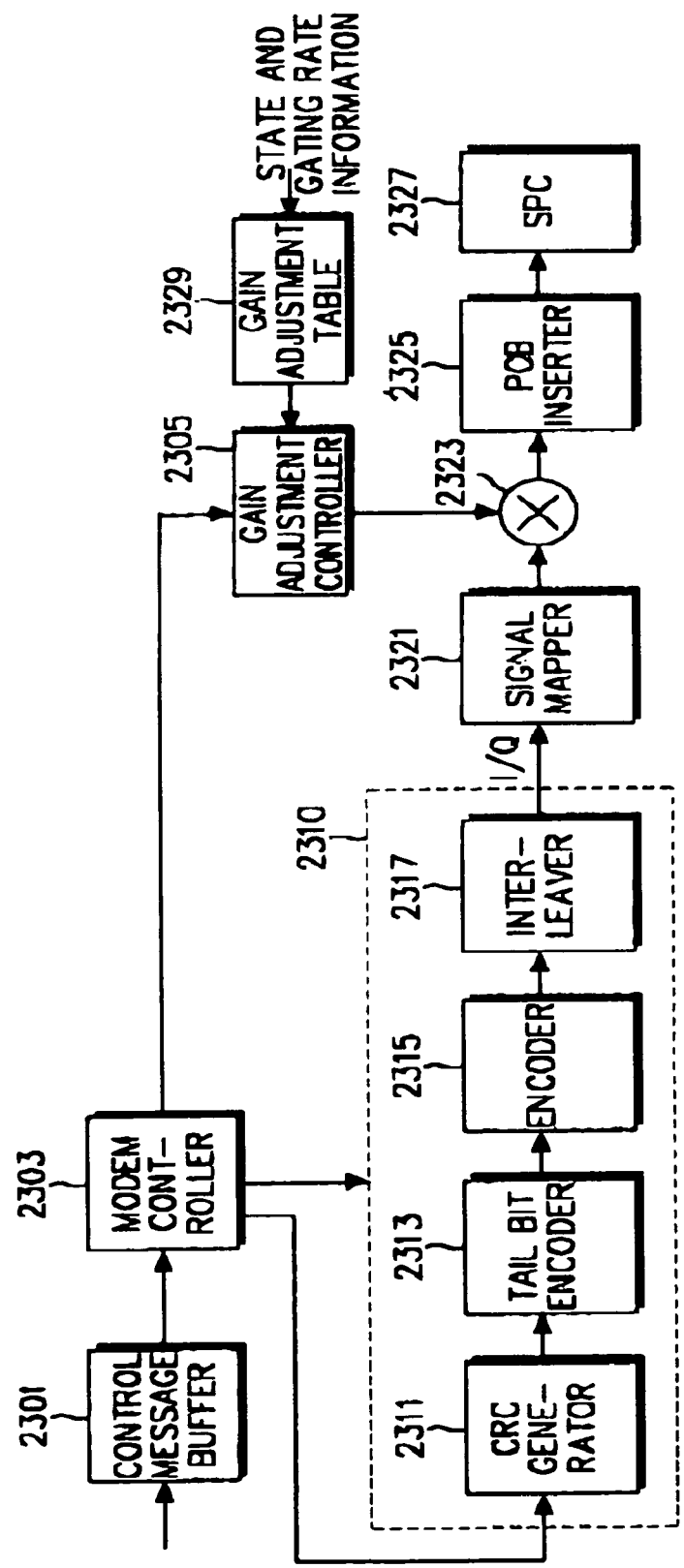
FIG. 23 is a block diagram of an embodiment of a base station transmitter in the synchronous IMT-2000 system.

FIG. 23 is a block diagram of a transmitter in a synchronous IMT-2000 base station operated in a gated transmission mode in a control hold state according to an embodiment of the present invention. A description of the same components as shown in FIG. 1 will be omitted.

Referring to FIG. 23, a gain adjustment table 2329 has a gain adjustment table in which gains are listed with respect to transmission power levels of a traffic signal to be controlled according to communication states and gating rates. The gain adjustment table can be empirically obtained and shown as Table 5 by way of example.

TABLE 5

| gating rate | gain adjustment value (dB) |
|---|---|
| ½ | +2.5 |
| ¼ | +3.5 |
| ⅛ | +6.0 |

Table 5 can be made for each RC.

A gain adjustment controller 2305 reads a transmission power gain adjustment value for a traffic signal from the gain adjustment table storage 2329 based on information about a communication state and a gating rate received from a higher layer processor and feeds the gain adjustment value to a multiplier 2323 which acts as a gain adjuster. The gain adjuster 2323 adjusts the transmission power gain of the traffic signal with the gain adjustment value received from the gain adjustment controller 2305, while establishing a path for transmitting a control message or blocking the control message from being transmitted according to a gain control signal received from a MODEM controller 2303 as stated earlier with reference to FIG. 1.

Figure 2:
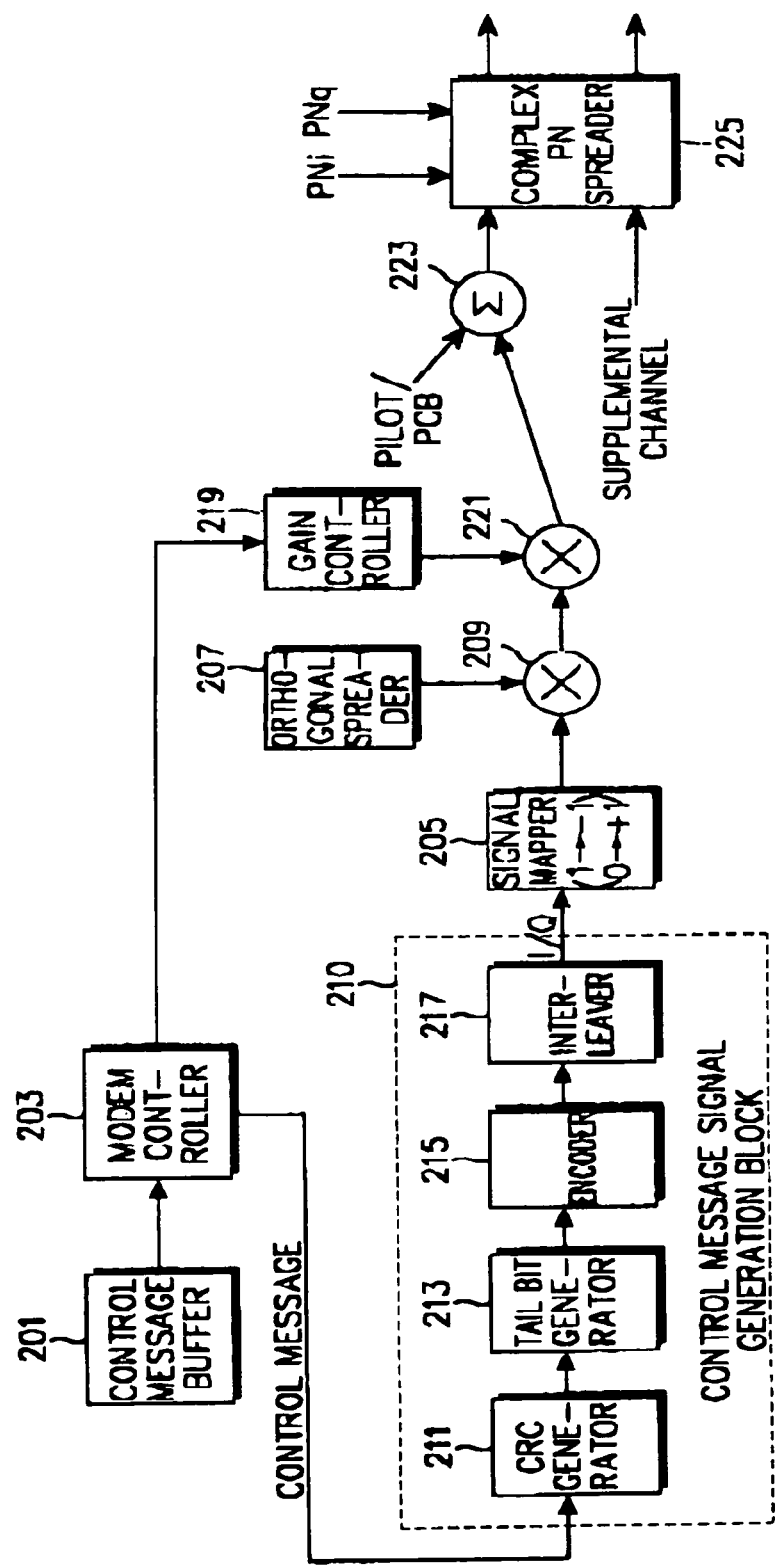
FIG. 2 is a block diagram of a reverse link transmitter operated in a DTX mode in a conventional CDMA mobile communication system.
Figure 24:
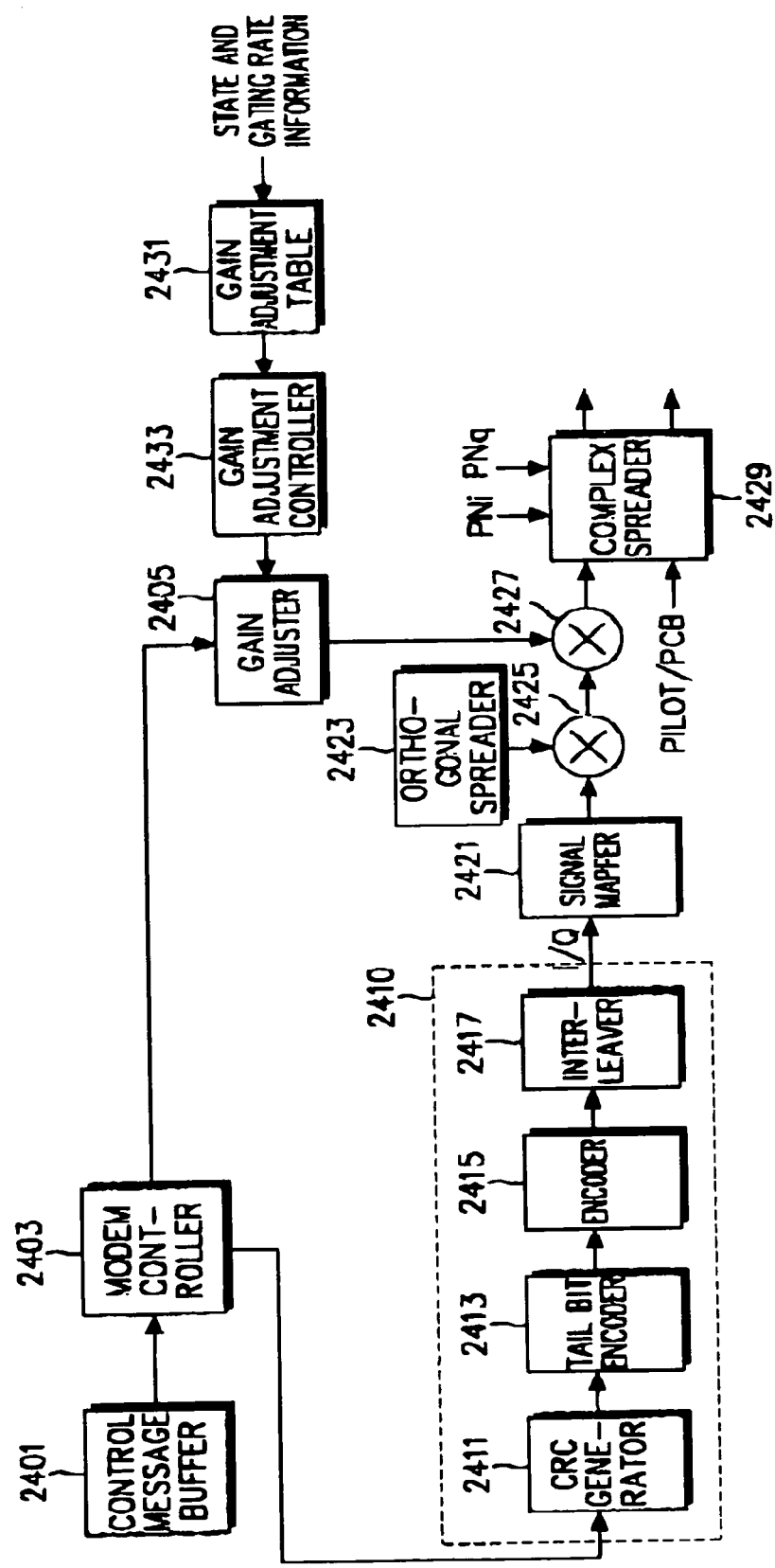
FIG. 24 is a block diagram of an embodiment of a mobile station transmitter in the synchronous IMT-2000 system.

FIG. 24 is a block diagram of a transmitter in a synchronous IMT-2000 mobile station operated in a gated transmission mode in a control hold state according to an embodiment of the present invention. A description of the same components as shown in FIGS. 2 and 23 will be omitted.

Referring to FIG. 24, a gain adjustment table storage 2431 may acquire a gain adjustment table in one of the four ways described referring to FIG. 21A.

Figure 25A:
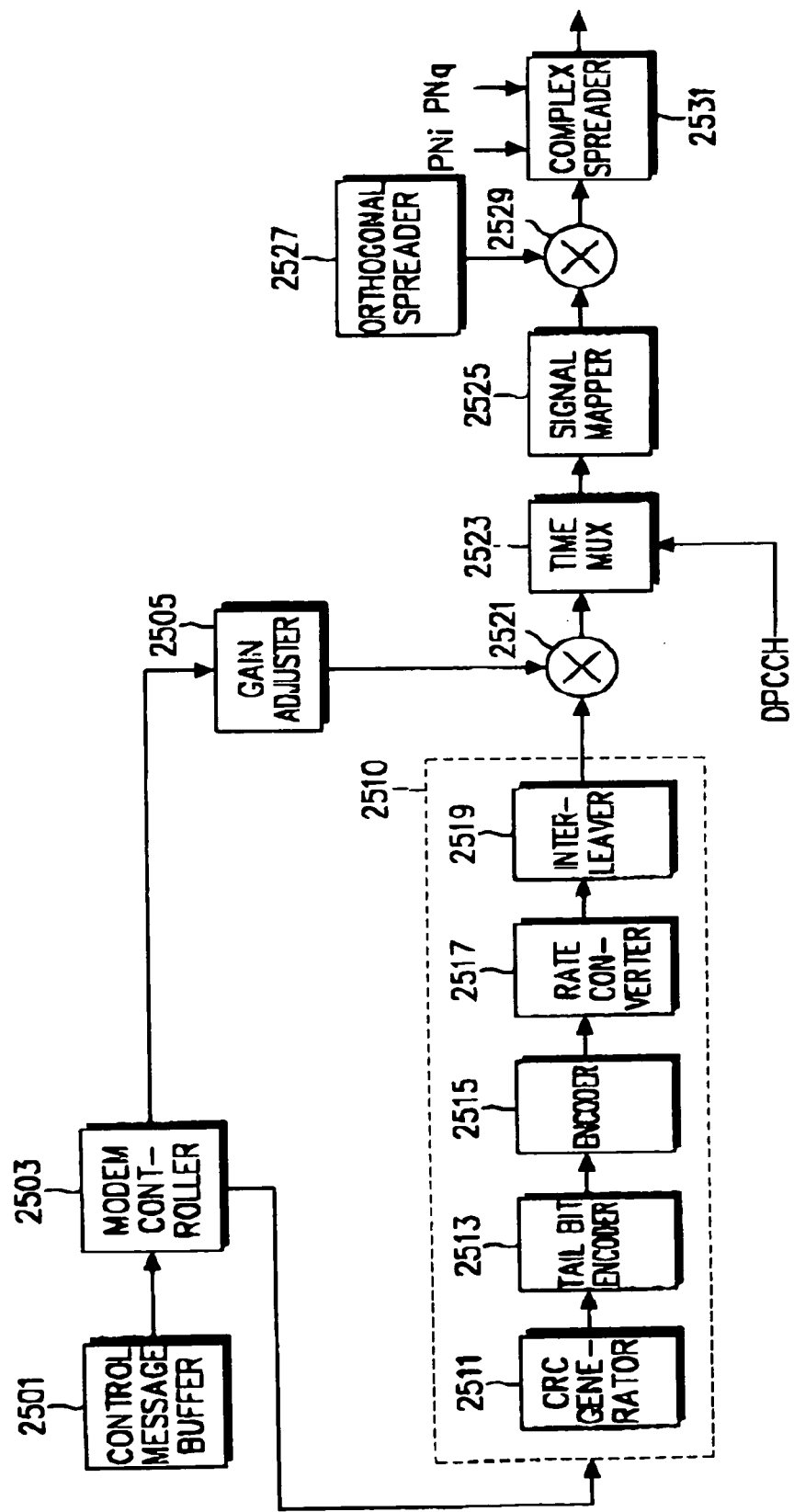
FIG. 25A is a block diagram of a base station transmitter in a conventional asynchronous IMT-2000 system.
Figure 25B:
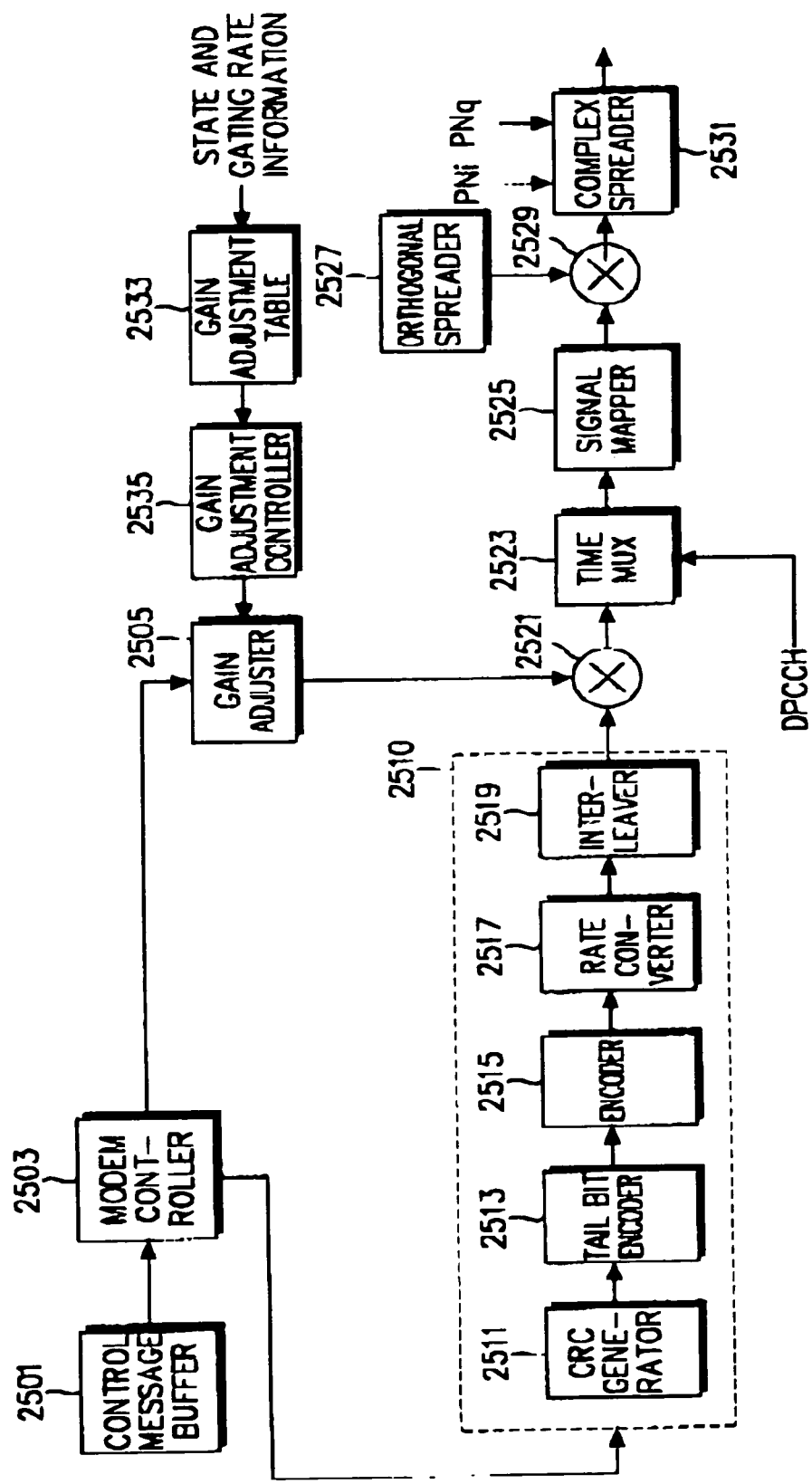
FIG. 25B is a block diagram of an embodiment of a base station transmitter in an asynchronous IMT-2000 system according to the present invention.

FIG. 25B is a block diagram of a transmitter in an asynchronous IMT-2000 base station operated in a gated transmission mode in a control hold state according to an embodiment of the present invention. A description of the same components as shown in FIG. 23 will be omitted.

Referring to FIG. 25B, the rate converter 2517 changes the rate of the output signal of the encoder 2515 to that of the input signal of the interleaver 2519 by repeating or puncturing the output of the encoder 2515 when the rate at the output of the encoder 2515 is different from that at the input of the interleaver 2519.

Figure 26A:
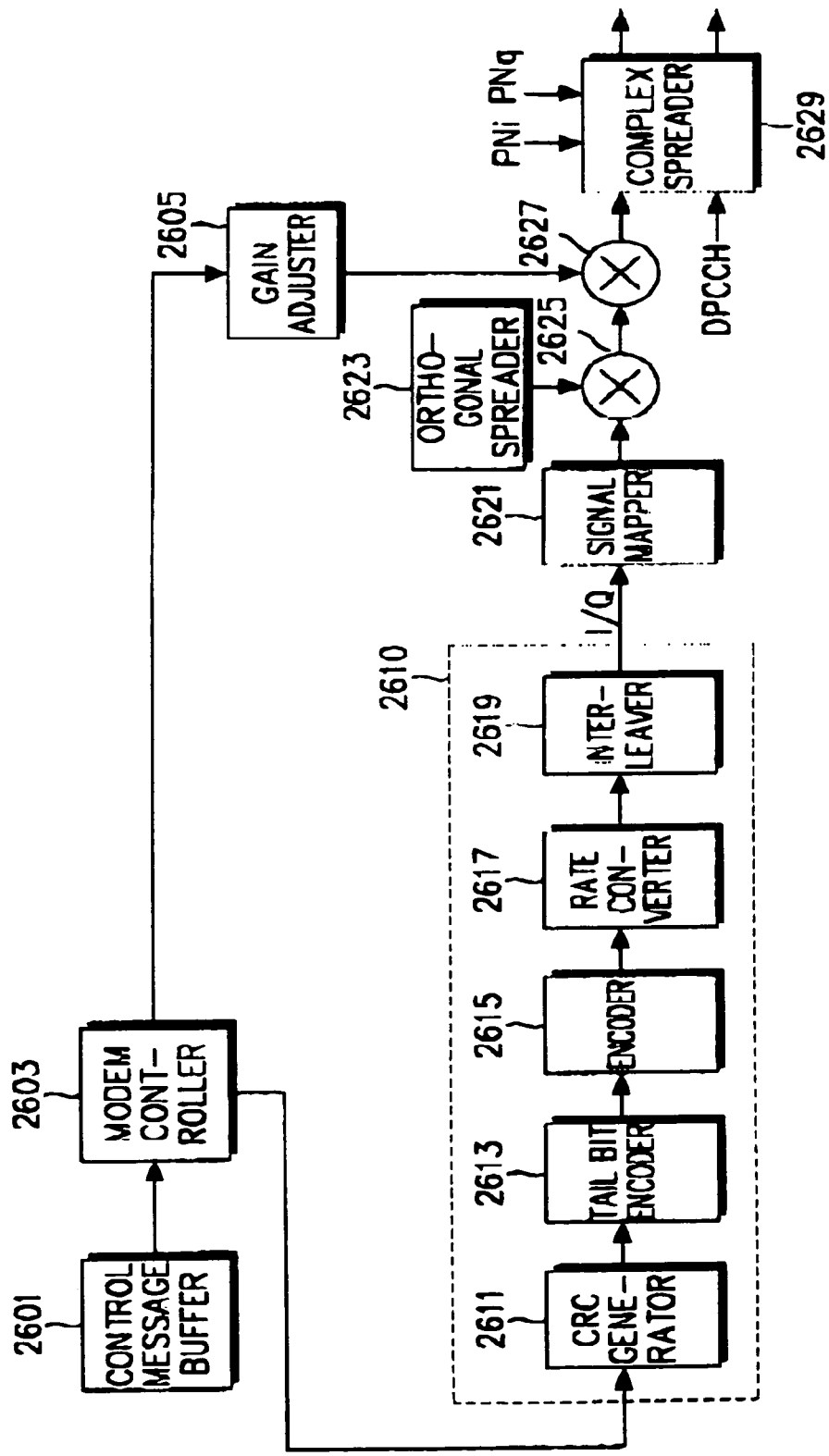
FIG. 26A is a block diagram of a mobile station transmitter in the conventional asynchronous IMT-2000 system.
Figure 26B:
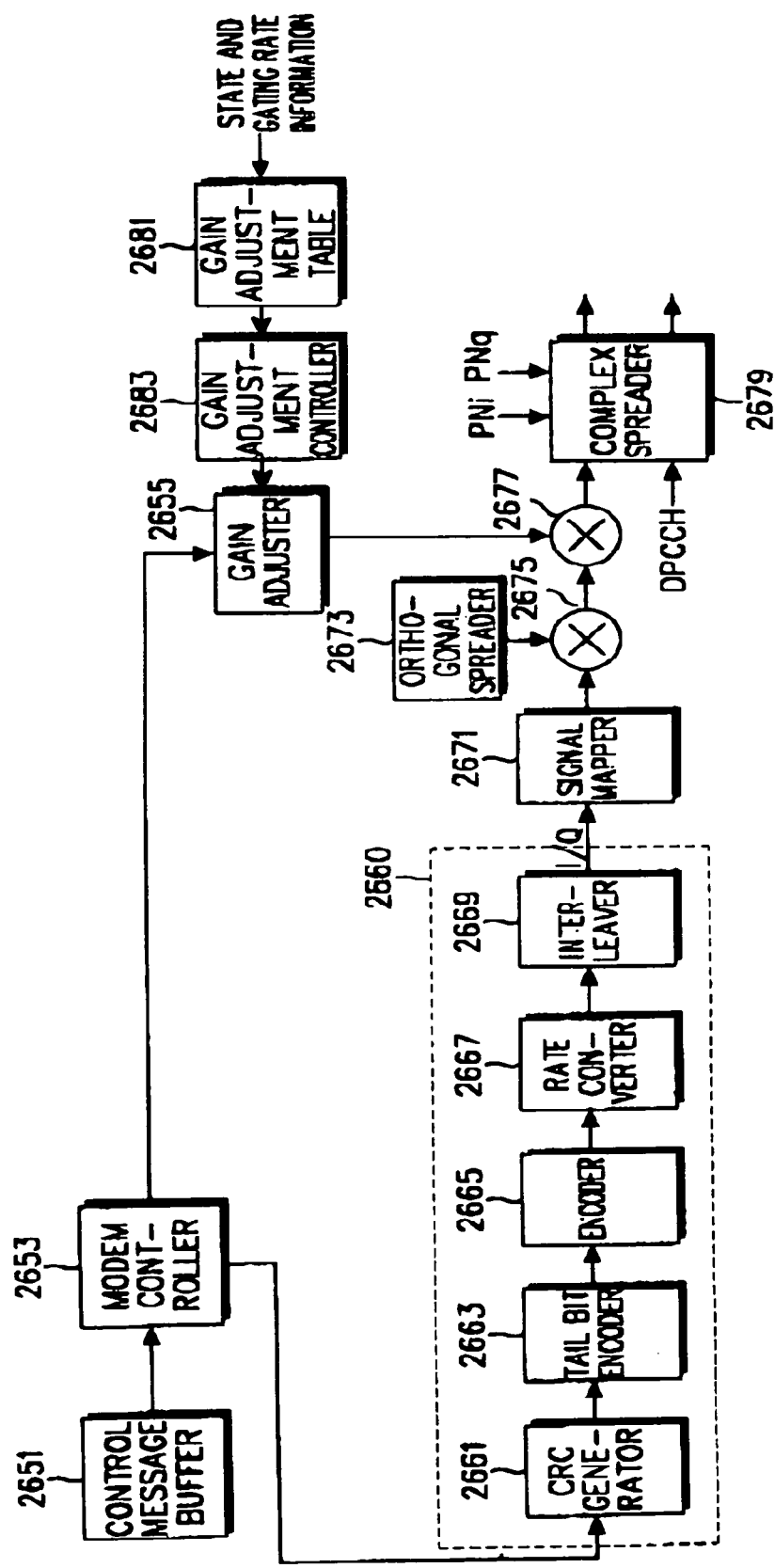
FIG. 26B is a block diagram of an embodiment of a mobile station transmitter in the asynchronous IMT-2000 system according to the present invention.

FIG. 26B is a block diagram of a transmitter in an asynchronous IMT-2000 mobile station operated in a gated transmission mode in a control hold state according to an embodiment of the present invention. A description of the same components as shown in FIGS. 24 and 25B will be omitted.

As described above, the present invention is advantageous in that (1) since an outer-loop power control is possible even for a non-data transmission period while in DTX mode, an accurate threshold for outer-loop power control can be obtained when a data frame is generated; (2) transmission power can be saved and frame errors can be decreased due to the accurate threshold; (3) time required to converge a pre-transition threshold to a post-transition threshold in an outer-loop power control operation is reduced through threshold compensation; (4) the decrease of the convergence time prevents power consumption involved in the convergence and reduces frame errors; and (5) transmission power is minimized in the absence of a traffic signal to be transmitted in a gated transmission mode and in the presence of a traffic signal to be transmitted, the reception performance of the traffic signal is ensured.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A power controlling device in a mobile communication system, comprising:
    a frame error detector for detecting an error from a frame of a predetermined length and for generating an error signal indicating whether an error has been generated;
    a closed-loop power controller for comparing a threshold with a signal-to-noise ratio (SNR) of each power control group (PCG) in a plurality of periods of a frame and for generating power control information according to the comparison result;
    an outer-loop power controller for increasing the threshold to generate power control information commanding power increase in response to an error signal indicating the existence of a frame error and for decreasing the threshold to generate power control information commanding power decrease in response to an error signal indicating the absence of a frame error; and
    an offset controlling unit connected to the outer-loop power controller, for receiving gating information about gated transmission of data in a frame at a predetermined rate and for generating an offset signal indicating an offset corresponding to a changed gating rate if the gating rate is changed,
    wherein the power is controlled whether or not there is data to be transmitted.

2. The power controlling device of claim 1, wherein the offset controlling unit includes:
    an offset table storage for storing offsets with respect to variations in gating rates according to state transition and variations in gating rates in the same state; and
    an offset controller for receiving state transition and gating rate information from a higher layer, for reading an offset corresponding to the received information, and for outputting the offset to the outer-loop power controller.

3. A mobile communication system comprising:
    a transmission power controlling circuit for receiving a data signal to transmit and power control information, for controlling a gain of the data signal based on the power control information, thereby controlling the transmission power of the data signal; and
    an offset controlling unit connected to the transmission power controlling circuit, for receiving a gating information signal, and for outputting an offset signal indicating a gain value for compensating the transmission power according to the gating rate;
    wherein the transmission power controlling circuit controls the transmission power of the data signal by adding the offset to or subtracting the offset from the gain value, and wherein the power is controlled whether or not there is data to be transmitted.

4. The mobile communication system of claim 3, wherein the offset controlling unit includes:
    an offset table storage for storing offsets with respect to variations in gating rates according to state transition and variations in gating rates in a same state; and
    an offset controller for receiving state transition and gating rate information from a higher layer, for reading an offset corresponding to the received information, and for outputting the offset to the outer-loop power controller.

5. A receiving device in a CDMA (Code Division Multiple Access) mobile communication system, which receives information about a pre-transition gating rate and a post-transition gating rate from a base station upon state transition, comprising:
- an offset table storage for storing offsets according to state transitions;
- an offset controller for receiving state transition information through a higher layer message, and for reading an offset corresponding to the state transition information from the offset table storage; and
- an outer-loop power controller for storing a previous threshold, for performing an outer-loop power control operation by adding the previous threshold to the offset received from the offset controller, and for outputting a threshold,
- wherein the power is controlled whether or not there is data to be transmitted.

6. The receiving device of claim 5, further comprising:
- a closed-loop power controller for receiving the threshold and for performing a closed-loop power control operation.

7. A receiving device in a CDMA mobile communication system, which receives information from a base station upon a state transition, said information including pre-transition and post-transition gating rate information and an offset table, said offset table listing offsets versus state transitions, comprising:
- an offset table storage for storing an offset table;
- an offset controller for receiving the offset table through a higher layer message, for storing the offset table in the offset table storage, for receiving state transition information, and for reading an offset corresponding to the state transition information from the offset table storage; and
- an outer-loop power controller for storing a previous threshold, for performing an outer-loop power control operation by adding the previous threshold to the offset received from the offset controller, and for outputting a threshold,
- wherein the power is controlled whether or not there is data to be transmitted.

8. The receiving device of claim 7, further comprising:
- a closed-loop power controller for receiving the threshold and for performing a closed-loop power control operation.

9. A receiving device in a CDMA (Code Division Multiple Access) mobile communication system, which receives an offset with respect to a pre-transition gating rate and a post-transition gating rate from a base station upon state transition, comprising:
- an offset controller for detecting and receiving an offset through a higher layer message and for outputting the offset; and
- an outer-loop power controller for storing a previous threshold, for performing an outer-loop power control operation by adding the previous threshold to the offset received from the offset controller, and for outputting a threshold,
- wherein the power is controlled whether or not there is data to be transmitted.

10. The receiving device of claim 9, further comprising:
- a closed-loop power controller for receiving the threshold and for performing a closed-loop power control operation.

11. A power controlling method in a CDMA (Code Division Multiple Access) mobile communication system in which information is received from a base station upon a state transition, said information including pre-transition and post-transition gating rate information and an offset table, said offset table having offsets versus state transitions, comprising the steps of:
- receiving the offset table through a higher layer message;
- storing, by an offset controller, the offset table in an offset table storage;
- receiving state transition information through the higher layer message;
- reading, by the offset controller, an offset corresponding to the state transition from the offset table;
- performing an outer-loop power control operation by adding a previous threshold to the offset received from the offset controller; and
- outputting, by an outer-loop power controller, a threshold,
- wherein the power is controlled whether or not there is data to be transmitted.

12. The power controlling method of claim 11, further comprising the step of:
- performing, by a closed-loop power controller, a closed-loop power control operation according to the threshold.

13. A power controlling method in a CDMA (Code Division Multiple Access) mobile communication system in which an offset with respect to a pre-transition gating rate and a post-transition gating rate is received from a base station upon state transition, comprising the steps of:
- detecting, by an offset controller, an offset in a higher layer message;
- outputting, by an offset controller, the offset;
- performing an outer-loop power control operation by adding a previous threshold to the offset received from the offset controller; and
- outputting, by an outer-loop power controller, a threshold,
- wherein the power is controlled whether or not there is data to be transmitted.

14. The power controlling method of claim 13, further comprising the step of:
- performing, by a closed-loop power controller, a closed-loop power control operation according to the threshold.

* * * * *